US009436335B1

(12) United States Patent
Scherer et al.

(10) Patent No.: US 9,436,335 B1
(45) Date of Patent: Sep. 6, 2016

(54) INPUT TRANSFORMATIVE SYSTEM

(71) Applicant: AMAZON TECHNOLOGIES, INC., Seattle, WA (US)

(72) Inventors: Nathan David Scherer, Sammamish, WA (US); Darren Ernest Canavor, Redmond, WA (US); Daniel Wade Hitchcock, Bothell, WA (US); Jesper Mikael Johansson, Redmond, WA (US); Jon Arron McClintock, Seattle, WA (US); Gregory Branchek Roth, Seattle, WA (US); Andrew Jay Roths, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/502,859

(22) Filed: Sep. 30, 2014

(51) Int. Cl.
*G06F 3/044* (2006.01)
*G01R 27/26* (2006.01)
*G06F 3/041* (2006.01)

(52) U.S. Cl.
CPC ........... *G06F 3/044* (2013.01); *G01R 27/2605* (2013.01); *G06F 3/0412* (2013.01); *G06F 2203/04111* (2013.01)

(58) Field of Classification Search
None
See application file for complete search history.

(56) References Cited

U.S. PATENT DOCUMENTS

| 2012/0050165 A1* | 3/2012 | Kim | G06F 3/04886 345/168 |
| 2012/0328349 A1* | 12/2012 | Isaac | G06F 3/04886 400/491 |
| 2013/0094126 A1* | 4/2013 | Rappoport | G02B 27/01 361/679.01 |
| 2014/0022174 A1* | 1/2014 | Chen | G06F 3/044 345/168 |
| 2014/0184555 A1* | 7/2014 | Pi | G08C 17/06 345/174 |
| 2015/0261297 A1* | 9/2015 | Quek | G06F 3/016 345/174 |
| 2015/0277632 A1* | 10/2015 | Wang | G06F 3/044 345/174 |

OTHER PUBLICATIONS

Seifert, Dan, "Samsung resurrects the dream of a hardware keyboard", The Verge, Aug. 13, 2015, [Retrieved on Aug. 27, 2015]. Retrieved from the Internet <URL:http://www.theverge.com/2015/8/13/9147239/samsung-keyboard-case-note-5-s6-edge-plus>.

\* cited by examiner

*Primary Examiner* — Joseph Haley
*Assistant Examiner* — Emily Frank
(74) *Attorney, Agent, or Firm* — Lindauer Law PLLC

(57) ABSTRACT

Described in this disclosure is an input transformative device having an input side and an output side. The input transformative device may be configured to transfer a touch input at an input location on the input side to one or more output locations on the output side. The output side of the input transformative device may be positioned proximate to a touch sensor of a user device. The touch sensor may then detect the touch input of the user as occurring at the one or more output locations, rather than the input location. Interconnection between the input side and the output side may be predetermined and used to secure user input to the touch sensor. The interconnection pattern of inputs to outputs of the input transformative device may be fixed or reconfigurable. In some implementations, input using the input transformative device may be used to authenticate the user.

20 Claims, 12 Drawing Sheets

INPUT TRANSFORMATIVE SYSTEM

BACKGROUND

Touch sensors are widely used to accept input from users on a variety of devices. These devices may include smartphones, tablet computers, portable computers, portable content players, electronic book (e-book) readers, medical devices, industrial instrumentation, and so forth. The input may include user selection of one or more options, or the input may include entry of information that may be used at least in part to authenticate the user. For example, the user may enter a personal identification number (PIN), username, password, or other information using the touch sensor. In some implementations, it may be useful to provide additional security with regard to the entry of information to the touch sensor.

Figure 1:
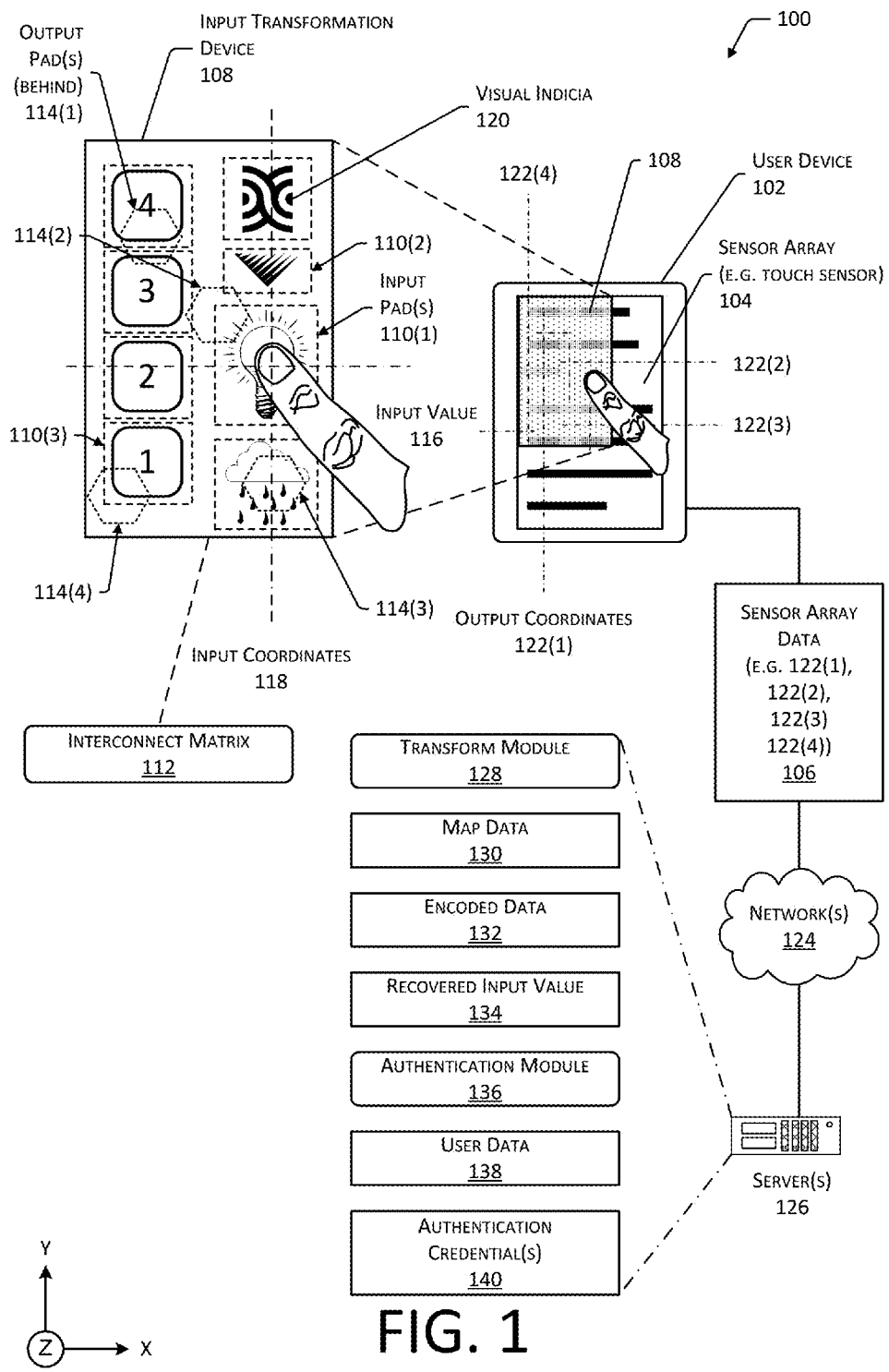
FIG. 1 is an illustrative system using an input transformation device comprising an interconnect matrix to accept user input and provide a signal to a sensor array, according to one implementation.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout. The figures are not drawn to scale. In some figures, the scale and proportions have been exaggerated for clarity of illustration. Unless otherwise specified, relative sizes or proportions between elements of the figures are illustrative and are not to be construed as limiting.

DETAILED DESCRIPTION

A wide variety of devices are configured to accept input from users. These devices may include smartphones, tablet computers, portable computers, portable content players, electronic book (e-book) readers, medical devices, industrial instrumentation, tools, vehicles, industrial equipment, building control systems, and so forth. The devices may be portable or stationary during use.

Sensor arrays comprising a plurality of sensor elements may be used to accept input from a user. The sensor elements may be configured to generate a signal that is indicative of an input provided from the user. The sensor elements may be sensitive to an applied mechanical force, changes in one or more of electrical capacitance, resistance, or inductance, a change in an optical signal, and so forth. The sensor elements may be arranged in various patterns suitable for the desired application. For example, the sensor elements in a sensor array configured for use as a touch sensor may be arranged in a regular pattern of rows and columns.

In some implementations, the sensor array may be combined with other devices. For example, the sensor array and a display device may be combined to form a touchscreen.

The touch sensor may be used to detect input in the form of a touch (or near touch) of the user. For example, the sensor array may comprise a plurality of sensor elements, in which each sensor element is configured to detect a change in capacitance resulting from proximity or contact with a human finger. A touch of the user's finger, or even close proximity of the user's finger, may produce a change in the capacitance. The change in capacitance may be used to generate a signal indicative of the touch.

In another example, the sensor array may comprise sensor elements, such as photodetectors, configured to detect incident light. Continuing the example, placement of the user's finger over the sensor element may block ambient light and result in a signal indicative of the touch.

Improvements in sensor array controllers and fabrication of sensor elements has resulted in sensor arrays that include an increasing number of sensor elements per unit of area as well as improvements in the ability to detect input at a plurality of different sensor elements. For example, touch sensors may be able to detect one hundred simultaneous discrete touches as small as a millimeter in an area.

Sensor arrays, including touch sensors, are versatile and useful devices to accept input from a user. Devices coupled to the sensor arrays may use the signals produced by the sensor array responsive to the touches of the user to perform one or more actions. For example, a user device such as a tablet computer or smartphone may include a sensor array configured to act as a touch sensor. A touch upon the touch sensor and the corresponding output coordinates of that touch may be used to trigger a particular action, such as activating an application for execution.

In some situations, the input provided by the user may be used to generate authentication credentials, select one or more options, and so forth. For example, the input may be used at least in part to authenticate the user. Continuing the example, the user may enter a personal identification number (PIN), username, password, or other information using the touch sensor.

Traditionally, input to the sensor array such as the touch sensor has been vulnerable to attack. For example, an attacker may watch another user enter their PIN on a touchscreen. After seeing the PIN as entered, the attacker may be able to enter the PIN at a later time to pose as the user and gain unauthorized access to the privileges associated therewith. To mitigate this, in some situations, multifactor authentication may be used that involves what the user to be authenticated knows (in this example the PIN) as well as by requiring the user to provide a particular object. Traditionally, this involves presentation of a token that is interrogated by a different sensor. For example, a fob containing a radio frequency identification (RFID) tag may be read by an RFID reader. The information acquired from the RFID tag used as part of the multifactor authentication process.

Described in this disclosure are various implementations of an input transformation device that may be used in conjunction with the sensor array to accept user input and generate sensor array data. The input transformation device may be used as part of a multifactor authentication system in which the presence of the input transformation device and the input accepted from the user produce output that may be used to provide authentication credentials. For example, a device in communication with the sensor array, such as the user device to which the sensor array is mounted or a server in communication with the user device, may process the sensor array data to determine the input of the user. Based on the user's input, authentication credentials may be generated or other actions taken.

The input transformation device comprises one or more input pads and an interconnect matrix that couples the one or more input pads to one or more output pads. The input transformation device is configured to be placed proximate to the sensor array during operation. For example, the input transformation device may be in the form factor of a card that is placed in contact with the sensor array. When not in use, the input transformation device may be removed from proximity of the sensor array.

Input from the user, or the effect thereof, is directed by the interconnect matrix to the one or more output pads. For example, the input transformation device configured to operate in conjunction with a sensor array using capacitive sensor elements may include input pads and output pads made of electrically conductive material that are connected by way of one or more electrically conductive elements such as wires or traces in the interconnect matrix. When the input transformation device overlays the sensor array, the touch of the user to an input pad causes a change in capacitance to be detected by the sensor array proximate an output pad connected to the input pad via the interconnect matrix. The input transformation device effectively transforms the location of a touch on one side of the device to a different location on the other side of the device. The change in location can be along any directional axis. For example, a touch of an input pad located at the center of the user-facing side of the input transformation device can be transformed to a touch detected by the sensor array corresponding to an upper left corner of the sensor array. To put it another way, if the input transformation device did not overlay the sensor array, the touch would be detected at the center of the sensor array. By placing the input transformation device over the sensor array, a touch at the same location (i.e., the center of sensor array) is transformed by the input transformation device to a different location of the sensor array (e.g., the upper left corner of the sensor array).

In one implementation, an individual input pad may be coupled to a plurality of output pads. For example, a single touch input of the user may result in the sensor array reporting three touches to the sensor array. The output pads may or may not be proximate to one another. Continuing the example, the three touches detected by the sensor array may be separated by a predetermined distance from one another.

The input transformation device may also be configured to encode data by using one or more signal producing components to generate signals at the sensor array without input from the user. Continuing the example above with regard to the sensor array comprising one or more capacitive sensor elements, the input transformation device may include one or more capacitors or capacitive elements configured to change the capacitance at one or more sensor elements upon coupling. For example, the input transformation device may generate signals from the sensor array indicative of a touch even when the user is not touching the input pad.

The interconnect matrix may be preconfigured or may be modifiable. For example, the interconnect matrix may comprise hardwired circuit traces that are printed onto one or more components of the input transformation device. In another example, the interconnect matrix may comprise one or more semiconductor devices such as transistors that may be controlled by a controller such that the interconnection of a particular input pad to a particular output pad may be changed.

As described above, the sensor array provides sensor array data indicative of signals produced by the sensor elements therein as responsive to the output pads of the input transformation device. As described above, the signal responsive to the output pad may result from input of the user or from a signal producing component coupled to the output pad. The sensor array data may comprise information indicative of output coordinates. The output coordinates may specify a location on the sensor array at which a signal was detected by a sensor element.

Map data may be accessed during processing of the sensor array data to determine a recovered input value. The map data provides information that associates output coordinates with a particular input value. For example, the map data may associate the set of output coordinates of the three touches described above with a particular input pad of the input transformation device. Data indicative of the particular input pad may be provided as a recovered input value.

The recovered input value may be used to provide authentication credentials. For example, the recovered input values may comprise a PIN that is associated with a particular user. The recovered input values may be compared with user data storing a previously stored PIN associated with the user. Should the recovered input value correspond to previously stored PIN, the user may be authenticated. In some implementations, the encoded data such as provided by the signal producing components may also be used. For example, the encoded data may provide information indicative of the configuration of the interconnect matrix, a serial number of the input transformation device, an orientation of the input transformation device relative to the sensor array, and so forth.

The input transformation device may include one or more visual or tactile indicia on the side closest to the user during operation. For example, the indicia may comprise printed letters, numerals, icons, and so forth, that have been printed onto the input transformation device. In some implementations, the input transformation device may include a display device configurable to change the indicia are presented. For example, the input transformation device may comprise an electrophoretic display that may be reprogrammed to show different icons in different arrangements relative to one another.

The user may carry the input transformation device with them. For example, where the input transformation device is in the form factor of a card, the input transformation device may be carried in a pocket, wallet, or purse. To use the input transformation device, the user places the input transformation device such that a side of the input transformation device having the output pads is proximate to the sensor array. For example, the user may place the input transformation device on a touchscreen of the user device. In some implementations, the user may change the orientation of the input transformation device relative to the sensor array. The change may be at the discretion of the user or may be responsive to a prompt. For example, the sensor array may include a display and a graphical element such as an arrow or icon that may indicate a particular orientation. This change may be used to improve the overall entropy of the input or to provide additional information. For example, the user orienting the input transformation device 180° from a predetermined "normal" orientation may generate a duress code that may be used to alert an administrative authority of a potential compromise of the user.

Once emplaced, the user may touch the input pads of the input transformation device to provide input. As described above, the input from the user is used to generate signals at the sensor elements proximate to one or more of the output pads. The input transformation device may also provide encoded data in the form of output pads coupled to one or more signal producing components such that a signal is presented in the sensor elements without input by the user.

The input transformation device may secure entry of information used to authenticate the user by obscuring from an attacker an association between the user's input and the sensor array data generated by the sensor array. For example, without the input transformation device, knowledge of a particular input sequence is insufficient to re-create the output coordinates represented by the sensor array data.

Security may be further improved by varying the interconnection of the input pads to the output pads. For example, a different input transformation device may be provided to the user or the interconnect matrix may be reprogrammed to provide different interconnections between the input pads and the output pads. As a result, the input transformation device may increase the entropy associated with user input and improve overall security associated with an authentication system for which the input transformation device is used.

Instead of, or in additional to improving security associated with input from the user, use of the input transformation device may enhance the ability of the user to provide input to the sensor array. For example, the input pads may be configured to accept input from a relatively large area and provide the effect of that input to a relatively small area of the sensor array, enabling a user with poor motor control to activate the sensor elements in the small area without inadvertently activating adjacent sensor elements.

Illustrative Devices

FIG. 1 is an illustrative system 100. The system 100 may include a user (not shown) and user device 102. The user device 102 may include a smartphone, tablet computer, portable computer, portable content player, e-book reader, medical device, industrial instrument, tool, vehicle, industrial equipment, building control system, and so forth. The user device 102 may be portable or stationary during use. For example, the user device 102 may comprise an automobile.

The user device 102 may include a sensor array 104. The sensor array 104 is configured to generate sensor array data 106 responsive to one or more effects associated with input. The sensor array 104 may comprise one or more sensor elements. The sensor elements may be sensitive to an applied mechanical force, changes in one or more of electrical capacitance, resistance, or inductance, a change in an optical signal, and so forth. In one implementation, the sensor array 104 may comprise a touch sensor configured to generate sensor array data 106 indicative of one or more touches to the sensor array 104 by the user or an object employed by the user, such as a stylus. The sensor array 104 is discussed in more detail with regard to FIG. 5.

An input transformation device 108 is configured to be used in conjunction with the sensor array 104 during operation. The input transformation device 108 may include one or more input pads 110(1), 110(2), . . . , 110(X). The input pads 110 may be positioned on a portion of the surface of the input transformation device 108 that faces and is proximate to the user during operation. The input pads 110 are configured to accept an input from the user. The input pads 110 are coupled to an interconnect matrix 112. The interconnect matrix 112 in turn is coupled to one or more output pads 114 located on the opposite side of the input transformation device 108. The interconnect matrix 112 is configured to direct at least a portion of an effect associated with an input from at least one input pad 110 to one or more of the output pads 114. As described below in more detail, the interconnect matrix 112 may comprise a predetermined or modifiable configuration. For example, where the interconnect matrix 112 is modifiable, the pattern of interconnections between the input pads 110 and the output pads 114 may be changed from a first configuration to a second configuration. For illustration and not by way of limitation, approximate boundaries of the input pads 110 and the output pads 114 are depicted using dotted lines in this figure.

An input associated with an input value 116 may be accepted at input coordinates 118. For example, the user may place a finger at a position indicated by the input coordinates 118 on the input transformation device 108. In some implementations, visual indicia 120 or other indicia such as tactile indicia may be provided by the input transformation device 108. For example, the visual indicia 120 may be printed onto at least a portion of the input transformation device 108, as indicated here by the numbers "1" through "4" and four icons including a "bulb". In another example, the visual indicia 120 may be provided by a display device of the input transformation device 108, such as an electrophoretic display. The visual indicia 120 may be provided for the convenience of the user while they provide their input. For example, the input value 116 associated with the input coordinates 118 corresponds to the "bulb" icon. In this illustration, the user is providing an input value 116 of the "bulb" icon. The input pad 110(1) corresponding to the visual indicia 120 indicative of the "bulb" icon is connected to the interconnect matrix 112, which in turn is connected to three of the output pads 114(1)-(3). As a result of the coupling provided by the interconnect matrix 112, an effect of the input provided by the user is distributed from the input pad 110(1) to the output pads 114(1)-(3).

In some implementations the visual indicia 120 may be provided by the user device 102. For example, the input transformation device 108 may be at least partially transparent or translucent, allowing for some visual information, as provided by a display associated with the sensor array 104, to be visible to the user. In some implementations, the visual indicia 120 may be moved, added, or removed from the input transformation device 108. For example, the relative position of the "bulb" icon may move from time to time or use to use, such that the "bulb" icon may be at the top left of the input transformation device 108 during one use, middle at another use, and so forth. In certain implementations, the input transformation device 108 includes multiple interconnect matrices that may transform the same or different physical properties. For example, one interconnect matrix 112(1) transforms a touch input on the user-facing side to multiple outputs on the sensor-array-facing side (as described above), while another interconnect matrix 112(2) transforms (e.g., via fixed or configurable light pipes or wave guides) visual indicia 120 presented by user device 102 to different locations on the user-facing side of the input transformation device 108. This may be useful in situations where the user device 102 may be an untrusted device (e.g., another person's phone in a payment transaction) since the user device 102 would not know where the visual indicia 120 were actually presented via the input transformation device 102 or how user selection of those visual indicia 120 were transformed to "touch" inputs detected by the sensor array 104. The touch input may comprise a touch from a user, or another object, such as a stylus.

During operation, the output pads 114 of the input transformation device 108 are proximate to the sensor array 104. The output pads 114 are configured to couple to one or more of the sensor elements within a sensor array 104. The coupling may be electromagnetic, physical, or combination thereof. The output pads 114 may provide at least a portion of an effect associated with the input as received by the input pad 110 to the sensor element of the sensor array 104.

As described above, responsive to the effect of the input as provided to the output pads 114, the sensor array 104 may generate sensor array data 106. For example, where the sensor array 104 comprises a touch sensor, the sensor array data 106 may comprise output coordinates 122. The output coordinates 122 provide information indicative of a location within a sensor array 104 at which a signal was detected. In some implementations, the output coordinates 122 may comprise a single set of coordinates, a range or area, and so forth.

In this illustration, four output coordinates 122(1)-(4) have been detected by the sensor array 104 and are indicated in the sensor array data 106. In this example, the input pad 110(1) is coupled by way of the interconnect matrix 112 to the output pads 114(1)-(3). The output pads 114(1)-(3) are physically separated from one another such that they generate signals in the sensor elements at the output coordinates 122(1)-(3) on the sensor array 104. The output coordinates 122(4) may be detected by the sensor array 104 as a result of a signal from one or more signal producing components. The signal producing components are described below in more detail.

This disclosure describes the interactions of the user with the input transformation device 108 in terms of a single touch for clarity of description and illustration and not necessarily as a limitation. For example, the input transformation device 108 may accept multiple simultaneous input values 116 and provide corresponding output at the output pads 114.

A fourth output pad 114(4) is coupled to a signal producing component that may be independent of the input effect provided by the user. Responsive to the signal producing component, the sensor element of the sensor array 104 at the fourth output coordinates 122(4) provides a signal. The fourth output pad 114(4), in this illustration, may be used to encode information, such as providing an indicia of orientation of the input transformation device 108 with respect to the sensor array 104. For example, output pads 114 that provide a signal without user input may be arranged in the corners of the input transformation device 108 to provide information as to the placement of the input transformation device 108 with respect to the sensor array 104. Encoded data is described below in more detail.

The input pads 110 and the output pads 114 cover at least some area on the respective sides of the input transformation device 108. The area of the input pads 110 may be determined based at least in part on the object used to provide the input value 116, the size of the input transformation device 108, the inter-pad spacing to reduce interference, the composition of the pad, and so forth. The area of the input pads 110 may differ from one input pad 110 to another. For example, the input pad 110(1) may have an area of 1 square centimeter (cm2) while the input pad 110(2) may have an area of 2 cm2.

Shape of the area of the input pads 110 may be the same, or may vary within the input transformation device 108. For example, some of the input pads 110 may be rectangular, while others are circular, irregular, and so forth.

The area of the input pads 110 may correspond to the size of the object used to provide the input value 116. For example, where the object is a fingertip the area may be greater than where the object is a stylus tip. In some implementations, several input pads 110 may be used to accept the input value 116. The area of combined input pads 110 may be user-selectable. For example, a user with large fingers may select to have the interconnect matrix 112 use a plurality of input pads 110 to provide a desired area.

The area of the output pads 114 may be determined based at least in part on the resolution of the sensor array 104, the size of the input transformation device 108, the inter-pad spacing to reduce interference, the composition of the pad, and so forth. The area of the output pads 114 may be determined based on the resolution of the sensor array 104 to detect input, material composition of the output pads 114, and so forth. The area of the output pads 114 may differ from one output pad 114 to another. For example, output pad 114(1) may have an area of 0.5 cm2 while the output pad 110(2) may have an area of 0.1 cm2. Shape of the area of the output pads 114 may be the same, or may vary within the input transformation device 108.

The sensor array data 106 may be processed by the user device 102 or may be provided to another device. As illustrated here, the sensor array data 106 may be sent by way of one or more networks 124 to a server 126 or other computing device.

The user device 102 may couple to one or more networks 124. The networks 124 may include public networks, private networks, or a combination thereof. The networks 124 may include, but are not limited to, personal area networks (PANs), local area networks (LANs), wide area networks (WANs), and so forth. The networks 124 may communicate using Ethernet, Wi-Fi™, Bluetooth®, ZigBee®, 3G, 4G, LTE, or other technologies.

A computing device such as a server 126 is coupled to the network 124 and is in communication with one or more of the user devices 102, other servers 126, other devices, and so forth. The server 126 may comprise one or more physical computing devices, virtual computing devices, or utilize a combination thereof. In some implementations, the server 126 may not require end-user knowledge of the physical location and configuration of the system that delivers the services. For example, the server 126 may be described using expressions including "on-demand computing", "software as a service (SaaS)", "platform computing", "network-accessible platform", "cloud services", "data centers", and so forth. Services provided by the computing device may be distributed across one or more physical or virtual devices.

The server 126 may include one or more modules and data including, but not limited to, a transform module 128, map data 130, encoded data 132, recovered input value 134, authentication module 136, user data 138, or authentication credentials 140. The transform module 128 may be configured to use the sensor array data 106 and the map data 130 to determine one or more of the encoded data 132 or the recovered input value 134. The map data 130 provides an association between the output coordinates 122 and the input value 116. For example, the map data 130 may associate the input coordinates 122(1)-(3) with the recovered input value 134 of "bulb", the input coordinates 118, or both.

In one implementation, the map data 130 may be expressed as absolute coordinates, such as generated by the sensor array 104. For example, the map data 130 may be expressed as (X,Y) coordinates for a particular display, assuming particular placement of the input transformation device 108. In another implementation, the map data 130 may be expressed as relative coordinates. For example, coordinates of one or more indicia encoded by the input transformation device 108 may be received and used to normalize or translate the coordinates to a system independent of that used by the sensor array 104. Continuing the example, the coordinates of the four corners of the input transformation device 108 may be used, and the subsequent output coordinates 122 may be transformed to a coordinate system relative to the area defined by the four corners.

As described above, in some implementations, the output pads 114 may be configured to generate a signal in the sensor elements of the sensor array 104 without input from the user. For example, the output pad 114(4) is configured to generate a signal in the sensor array 104 resulting in sensor array data 106 including at the output coordinates 122(4). The configuration of output pads 114 that are coupled to one or more signal producing components may be used to transfer information from the input transformation device 108 to the sensor array 104. This information may be retrieved by the transform module 128 to produce the encoded data 132. The encoded data 132 may be used to provide information indicative of orientation of the input transformation device 108 with respect to the sensor array 104, information indicative of the configuration of the interconnect matrix 112, information about the user, and so forth. For example, the encoded data 132 may store data about the user. Continuing the example, the encoded data 132 may indicate that the input transformation device 108 is associated with a user who is designated as a "Gold Customer" or "Sports Enthusiast".

In some implementations, the transform module 128 may use the encoded data 132 to produce the recovered input value 134. For example, the encoded data 132 may provide information indicative of a particular configuration of the interconnect matrix 112, such as a reference or identification number. Based at least in part on this information, the transform module 128 may retrieve or otherwise determine the appropriate map data 130 to use to generate the recovered input value 134.

The authentication module 136 is configured to use one or more of the encoded data 132, the recovered input value 134, or the user data 138 to generate the authentication credentials 140. The authentication credentials 140 may comprise encrypted or digitally signed data suitable for asserting an identity of the user, the user device 102, and so forth. The authentication credentials 140 may be used to allow access to the user device 102, authorize payment, and so forth. For example, the authentication credentials 140 may authorize a debit from an account of the user to pay for goods or services.

The authentication module 136 may be configured to compare the recovered input value 134 with previously stored information, such as the user data 138. The user data 138 may include information such as usernames, passwords, PINs, hash values associated therewith, and so forth. For example, the authentication module 136 may determine that the recovered input value 134 of "bulb" corresponds to value stored in the user data 138 of a particular user. In other implementations, operations other than comparison may be done using the recovered input value 134 and the user data 138 or other data. For example, the recovered input value 134 and the user data 138 may be summed, combined, or used as inputs to a previously defined algorithm.

In some implementations, the authentication module 136 may also use the encoded data 132 to generate the authentication credentials 140. For example, the encoded data 132 may comprise a user identifier. The authentication module 136 may use the user identifier value to retrieve the user data 138. In another example, the encoded data 132 may be used to provide a distress code or signal indicative of a potential compromise of the user or the input transformation device 108. In this example, the authentication module 136 may use encoded data 132 to determine an orientation of the input transformation device 108 with respect to the sensor array 104. Based at least in part on the orientation differing from a previously determined value, the authentication module 136 may determine that the authentication is proceeding with the user under duress or by an unauthorized user.

In some implementations, one or more of the functions as described herein associated with the server 126 may be performed by the user device 102. For example, the user device 102 may be configured to authenticate the user.

In this illustration, the input transformation device 108 is shown having an area less than that of the sensor array 104. In other implementations, the area of the input transformation device 108 may be approximately the same, or greater than, the area of the sensor array 104.

During operation, the input transformation device 108 may be placed in one or more different orientations with respect to the sensor array 104. For example, the input transformation device 108 may be rotated around a Z axis that is perpendicular to a plane of the sensor array 104. Continuing the example, the input transformation device 108 may be rotated 90° or 180° relative to the orientation depicted. The transform module 128 may be configured to generate recovered input values 134 based at least in part on the orientation of the input transformation device 108 relative to the sensor array 104. For example, the same sequence of input values 116 as made to the input pads 110 of the input transformation device 108 at different orientations may result in different recovered input values 134. Continuing the example, when the input transformation device 108 is rotated 90° relative to the sensor array 104, instead of the recovered input value 134 of the "bulb" icon, the recovered input value 134 may be "960720".

In one implementation, the input transformation device 108 may be configured such that input pads 110 and the output pads 114 are interchangeable. During operation, the input transformation device 108 may thus be "flipped" around the X or Y axes that are perpendicular to the Z axis. For example, both sides of the input transformation device 108 may include visual indicia 120. The user may then place the side containing the input pads 110 proximate to the sensor array 104 and provide input to the output pads 114 that are now proximate to the user. In this implementation, the selection of the face of the input transformation device 108 to place proximate to the sensor array 104 may be used to further increase entropy in the system, to provide encoded data 132, and so forth.

By combining rotation along the Z axis with the ability to flip along the X or Y axes, the input transformation device 108 may provide a number of permutations with which it may be coupled to the sensor array 104. As a result, a particular orientation of the input transformation device 108 may be used to increase the entropy associated with the input of the input values 116, encode information, and so forth.

The input transformation device 108 may include one or more features configured to maintain a particular orientation, particular spacing, and so forth, with respect to the user device 102 during operation. For example, the input transformation device 108 may include features configured to constrain the placement of the input transformation device 108 to particular orientations or positions on the sensor array 104. Continuing the example, a left side of the input transformation device 108 may be straight while a right side is curved, encouraging the user to place the straight left side against the left side of the sensory array 104. In another example, the input transformation device 108 may include surface features on the output pad 114 side configured to maintain a particular distance between the output pads 114 and the sensor array 104 during use. While the input transformation device 108 is depicted as a separate device or unit, in some implementations the input transformation device 108 may be integrated with or incorporated into another device. For example, the input transformation device 108 may be part of a case or cover for the user device 102.

Figure 2:
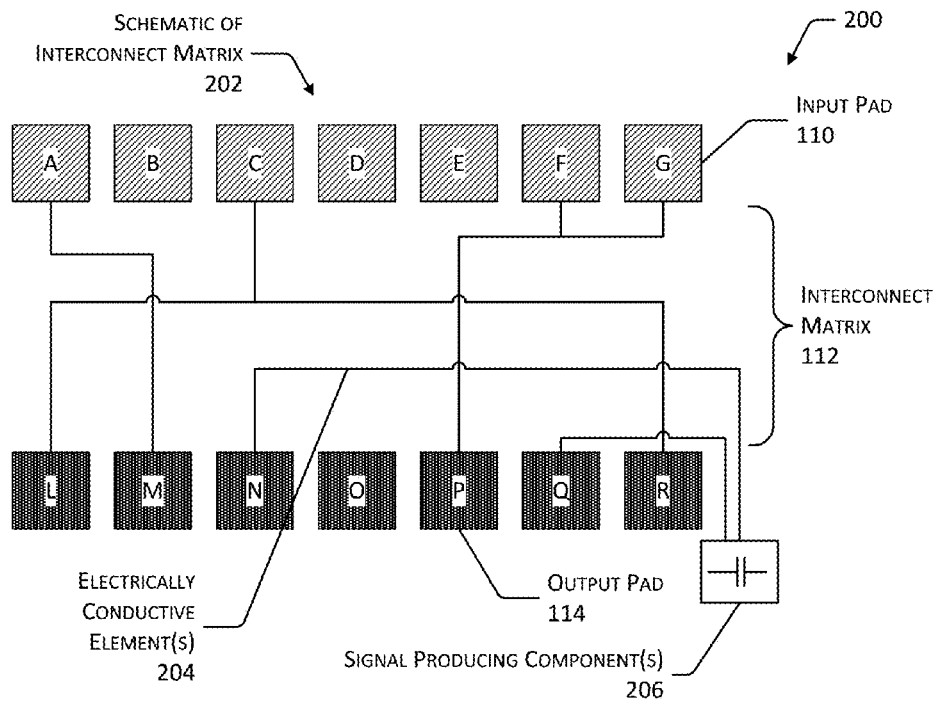
FIG. 2 illustrates a schematic of an interconnect matrix and associated interconnect data and map data, according to one implementation.

FIG. 2 depicts a portion 200 of the system 100. At 202, a schematic of the interconnect matrix 112 is depicted. In this schematic, one or more of the input pads 110 may be coupled to corresponding output pads 114. The interconnect matrix 112 is configured to provide a coupling between the input pad 110 and one or more of the output pads 114 such that at least a portion of an effect associated with input to the input pad 110 is provided to the output pad 114. As a result, a signal may be generated by a sensing element of the sensor array 104.

For purposes of illustration, and not necessarily as a limitation, the sensor array 104 may comprise one or more sensor elements configured to use a capacitive effect to generate a signal. For example, the sensor array 104 may comprise sensor elements configured to measure capacitance to determine the touch of the user. Changes in the capacitance measured by the sensor element may be used to generate a signal indicative of the touch. For example, proximity of the user's finger to the sensor element may cause an increase or decrease in the capacitance measured by the sensor element. Operation of the capacitive touch sensor is discussed in more detail below with regard to FIG. 5. In other implementations, the sensor array 104 may use other effects such as mechanical pressure, changes in electrical resistance, changes in electrical inductance, incident light, and so forth, to generate signals indicative of input.

In the situation where the sensor array 104 operates to detect input based at least in part on change of electrical characteristics such as capacitance, resistance, or inductance, the interconnect matrix 112 may comprise one or more electrically conductive elements 204. For example, the electrically conductive elements 204 may comprise wires, circuit traces, and so forth. The electrically conductive elements 204 of the interconnect matrix 112 may thus provide a particular pattern of interconnections between one or more of the input pads 110 and one or more of the output pads 114. The user may provide input at the input pad 110, such as by touching the input pad 110. This touch may alter the logical characteristics of the output pads 114 because of the conductive pathway provided by the electrically conductive elements 204. For example, a touch of the user's finger at the input pad 110(F) may result in a change in the capacitance of the sensor element on the sensor array 104 that is proximate to the output pad 114(P) (instead of an equivalent location proximate output pad 114(Q) if the input transformation device 108 had not been used). As a result, the input value 116 associated with the input coordinates 118 is transferred or directed to a different set of one or more output coordinates 122.

As described above, in some implementations, the orientation of the input transformation device 108 may be modified during operation. For example, the output pad 114 may be oriented proximate to the user during operation while the input pad 110 is proximate to the sensor array 104. In this orientation, the output pad 114 may accept the input from the user and provide the effect to the input pad 110 proximate to the sensor element of the sensor array 104. The interaction between the input pads 110 and the output pads 114 may be bidirectional such that an input effect received by one may be transferred at least in part to the other. In some implementations, the coupling of the interconnect matrix 112 may be asymmetrical. For example, the interconnect matrix 112 may include diodes configured to allow the transfer of an effect of one or more of the input pads 110 to one or more of the output pads 114, but the interconnect matrix 112 may preclude the transfer of an effect of input received at the output pads 114 to the input pads 110. As a result of an asymmetry introduced by the interconnect matrix 112, depending upon which face of the input transformation device 108 is proximate to the sensor array 104, a different pattern of interconnects may be presented.

In some implementations, the input transformation device 108 may generate signals in the sensor array 104 that are not responsive to user input. One or more signal producing components 206 may be coupled to one or more of the output pads 114. For example, as illustrated here, the signal producing component 206 is coupled to the output pads 114(N) and 114(Q).

The one or more signal producing components 206 are configured to generate a signal in a corresponding sensor element of the sensor array 104 during operation. The one or more signal producing components 206 may be passive or active components. For example, the one or more signal producing components 206 may comprise a capacitor that is connected by way of one or more electrically conductive elements 204 to the particular output pad 114. In another example, the one or more signal producing components 206 may comprise a resistor that is connected by way of one or more electrically conductive elements 204 to the particular output pad 114. In yet another example, the one or more signal producing components 206 may comprise a circuit that is powered and configured to oscillate and create an output signal.

In yet another example, the one or more signal producing components 206 may comprise particular structures or materials. For example, the signal producing component 206 may comprise a material having a persistent electrostatic charge. In this example, the material may be incorporated into the output structure in place of an output pad 114.

The interconnect matrix 112 is depicted in this illustration as a predefined set of electrically conductive elements 204 providing the interconnections between the input pads 110 and the output pads 114. As described below, in other implementations, the interconnect matrix 112 may be reconfigurable such that the pattern of interconnections between the input pads 110 and the output pads 114 may be changed.

Also depicted in this illustration is interconnect data 208. The interconnect data 208 represents the interconnections provided by the interconnect matrix 112. While the interconnect data 208 and other data described elsewhere in this disclosure is described in terms of a tabular or table data structure, in other implementations, the interconnect data 208 or other data may be stored in other data structures.

The interconnect data 208 may provide information indicative of which input pads 110 are associated with which output pads 114. In some implementations, the interconnect data 208 may indicate whether the connection is configured to provide a persistent 210 signal. For example, the signal producing component 206 that is coupled to the output pads 114(N) and (Q) may be configured to produce a signal in the sensor array 104 persistently during operation. In comparison, the signal produced by the sensor array 104 responsive to the output pad 114(M) is transient and generated only upon application of an input at the input pad 110(A).

In some implementations, the interconnect matrix 112 or circuitry associated therewith may be configured to introduce a delay, produce output having a particular sequence over time, and so forth. For example, the interconnect matrix 112 may be configured to accept the input from a constant touch at an input pad 110 and produce an effect at the output pad 114 corresponding to a series of intermittent touches.

As described above, the transform module 128 may use the map data 130 to determine a recovered input value 134. In this illustration, a table of map data 130 is depicted showing output coordinates 122 and the corresponding or associated input value 116. As illustrated here, the set of output coordinates 122(1)-(3) are associated with the input value 116 of the "bulb" icon. As a result, the transform module 128, upon processing sensor array data 106 that includes the set of output coordinates 122(1)-(3), may determine the recovered input value 134 to be the "bulb" icon.

The map data 130 associates the output coordinates 122(4) of the output pad 114(4) as coupled to a signal producing component 206 as being indicative of the orientation of the input transformation device 108 relative to the sensor array 104. For example, the output coordinates 122(4) associated with the output pad 114(4) may be interpreted by the transform module 128 as providing encoded data 132 indicative of the input transformation device 108 being in "Orientation A" relative to the sensor array 104.

Figure 3:
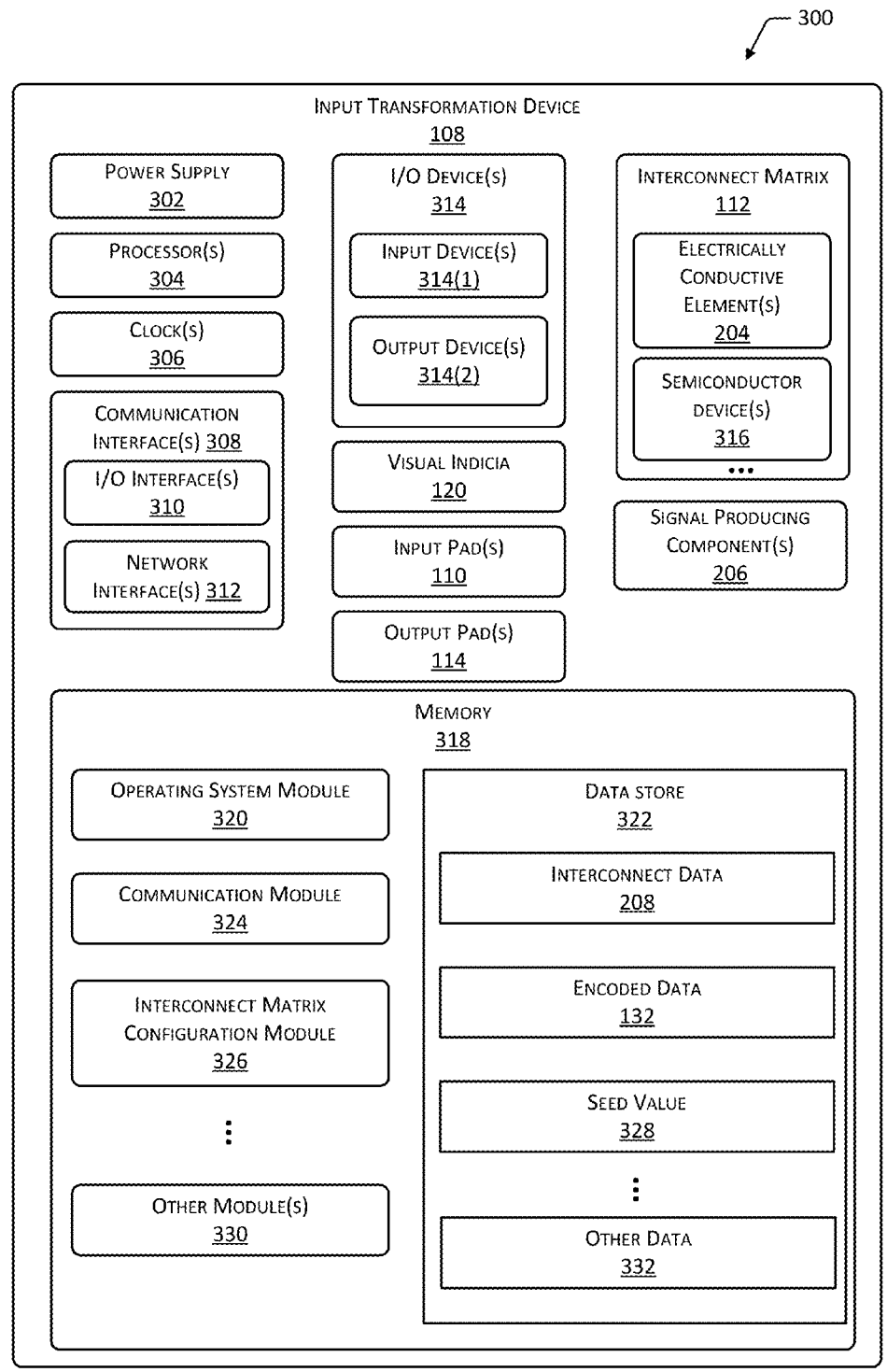
FIG. 3 illustrates a block diagram of the input transformation device, according to one implementation.

FIG. 3 illustrates a block diagram 300 of the input transformation device 108, according to one implementation. The input transformation device 108 may comprise one or more power supplies 302 configured to provide electrical power suitable for operating the components in the input transformation device 108 that require power. In some implementations, the power supply 302 may comprise a rechargeable battery, fuel cell, photovoltaic cell, power conditioning circuitry, wireless power coupling, kinetic energy harvester, and so forth. For example, the power supply 302 may include one or more photovoltaic cells configured to be arranged to receive incident light provided from the user device 102. Continuing the example, the sensor array 104 may be coupled with the display to provide a touchscreen. The display may be configured to emit light that may be harvested at least in part by the photovoltaic cell to produce logical power for operation of the input transformation device 108. In another example, the power supply 302 may comprise a wireless power coupling configured to use inductive or capacitive coupling to transfer electrical energy from the user device 102 to the input transformation device 108. In yet another example, a mass may be coupled to a motor such that motion of the input transformation device 108 results in a displacement of the mass. Displacement of the mass may result in the motor generating electrical current. In yet another example, the power supply 302 may be configured to harvest excess electrical charge, such as static charge or a charge differential of the user, as provided from the user while touching the input pads 110.

The input transformation device 108 may include one or more hardware processors 304 (processors) configured to execute one or more stored instructions. The processors 304 may comprise one or more cores. In some implementations, the processors 304 may comprise microcontrollers, discrete electronic circuitry, and so forth.

One or more clocks 306 may provide information indicative of date, time, ticks, and so forth. For example, the processor 304 may use data from the clock 306 to generate a timestamp, trigger a preprogrammed action, and so forth.

The input transformation device 108 may include one or more communication interfaces 308 such as input/output (I/O) interfaces 310, network interfaces 312, and so forth. The communication interfaces 308 enable the input transformation device 108, or components thereof, to communicate with other devices or components. The communication interfaces 308 may include one or more I/O interfaces 310. The I/O interfaces 310 may comprise interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 310 may couple to one or more I/O devices 314. The I/O devices 314 may include input devices 314(1) such as fingerprint sensors, buttons, and so forth. For example, the input devices 314(1) may comprise a keypad configured to accept input from the user. In some implementations, the input pads 110 may be coupled to circuitry such that the input value 116 may be determined and used by the input transformation device 108.

The I/O devices 314 may also include output devices 314(2) such as one or more of a display, audio speaker, buzzer, and so forth. For example, the display may comprise an electrophoretic display, liquid crystal display, cholesteric display, interferometric display, and so forth. The display may comprise a pixel-based addressable display, a segmented display, and so forth. In some embodiments, the I/O devices 314 may be physically incorporated with the input transformation device 108 or may be externally placed.

In one implementation, the I/O interface 310 may comprise one or more photodetectors, one or more lights including, but not limited to, light emitting diodes (LEDs), and so forth. The input transformation device 108 may be configured to exchange information with the user device 102 using optical transmission. For example, where the sensor array 104 is coupled with a display device such as a touchscreen, output of the touchscreen may be modulated to encode information as patterns of light that may be detected by the photodetectors of the input transformation device 108. In some implementations, the user device 102 may comprise photodetectors configured to detect light emitted by the LEDs or other lights of the input transformation device 108, enabling bidirectional communication between the input transformation device 108 and the user device 102.

The network interfaces 312 are configured to provide communications between the input transformation device 108 and other devices, such as the user device 102, the server 126, and so forth. The network interfaces 312 may include devices configured to couple to PANs, LANs, WANs, and so forth. For example, the network interfaces 312 may include devices compatible with Ethernet, Wi-Fi™, Bluetooth®, ZigBee®, Z-Wave, 3G, 4G, LTE, and so forth.

The communication interfaces 308 may include other technologies for sending or receiving information to another device. For example, the communication interface 308 may include one or more of a radio frequency identification (RFID) tag, RFID reader. In another example, the communication interface 308 may include a near field communication (NFC) system. The NFC system may be compliant with at least a portion of the specifications provided by the NFC Forum.

In addition to NFC, other means for short-range inter-device communication may also be utilized in accordance with the systems and methods of the present disclosure. Such compatible technologies include, but are not limited to, induction wireless, infrared wireless (such as technologies operating according to specifications and protocols provided by the Infrared Data Association, or IrDA), or ultra wide-band formats. In some implementations, the device may utilize short-range, low-power and high-frequency radio transmissions, such as Bluetooth®. In still other implementations, the device may support acoustic-based data transfer. For example, one device may include software components and a speaker that enable the device to broadcast data to the other device as sound waves, while the other device may include software components and a microphone that enable the other device to receive the data encoded in the sound waves. Thus, one or more of radio signal-based data transfer (e.g., NFC or Bluetooth®), light-based data transfer (e.g., infrared data transfer), an acoustic-based data transfer (e.g., sound wave-embedded data), or magnetic field-based transfer (e.g., reading the code from a magnetic stripe) may be used for inter-device communication. The protocols and components for enabling computing devices to perform the systems and methods of the present disclosure using such means for inter-device communication are well known to those skilled in the art of computer communications and, thus, need not be described in more detail herein.

The input transformation device 108 may also include one or more busses or other internal communications hardware or software that allow for the transfer of data between the various modules and components of the input transformation device 108.

The input transformation device 108 may also include the visual indicia 120. In some implementations, instead of or in addition to the visual indicia 120, tactile indicia may also be provided. For example, the tactile indicia may comprise bumps, dips, or other surface textures configured to be felt by the user during operation.

The input transformation device 108 may include one or more input pads 110 and one or more output pads 114. The pads may comprise components or features configured to accept at least a portion of an effect associated with an input. For example, the pads may comprise electrically conductive material such as a metal or conductive plastic where the effect to be transferred to the sensor array 104 is electrical in nature. In another example, the input pad 110 may comprise one or more structures coupled to one or more lever arms or other mechanical features such that an applied force such as pressure from the user's fingertip may be transferred to the interconnect matrix 112. The interconnect matrix 112 in this example may comprise one or more mechanical features configured to transfer at least a portion of the applied force to the output pad 114.

Instead of, or in addition to, one or more mechanical features, the interconnect matrix 112 may use a fluid as confined within one or more fluidic channels or pipes to communicate an applied force at an input pad 110 to the one or more output pads 114. For example, the interconnect matrix 112 may comprise pipes filled with a fluid and configured to hydraulically transfer at least a portion of the force at the input pad 110 to the one or more output pads 114.

The interconnect matrix 112 may comprise one or more of the electrically conductive elements 204 described above, one or more semiconductor devices 316, or other devices. The semiconductor devices 316 may include, but are not limited to, diodes, transistors, field effect transistors, bipolar junction transistors, resistors, capacitors, inductors, memristors, and so forth. The semiconductor devices 316 may be configured to selectively connect or disconnect one or more of the electrically conductive elements 204 from one or more of the input pads 110 or the output pads 114. For example, the semiconductor devices 316 may be able to change the interconnections to implement different interconnect data 208. Instead of, or in addition to semiconductor devices 316, other switching mechanisms may be used. For example, relays, microelectromechanical system (MEMs) devices, nano-relays, reed switches, mechanical switches, and so forth.

In some implementations, the semiconductor devices 316 may be configured to selectively couple one or more of the pads to the signal producing components 206. For example, the transistor may be activated to connect a capacitor to a particular output pad 114. Operation of the semiconductor devices 316 may be controlled at least in part by the processor 304.

As described above, the input transformation device 108 may include one or more signal producing components 206. Operation of the signal producing components 206, or the interconnection thereof by the interconnect matrix 112, may be controlled at least in part by the processor 304. For example, the processor 304 may be configured to direct a semiconductor device 316 to the signal producing component 206 to the output pads 114(N) and 114(Q). The signal producing components 206 may be passive or active. For example, an active component may require electrical energy to operate and produce an output signal. Continuing the example, the active component may comprise an oscillator circuit configured to generate an oscillating electric field at the output pad 114. In another example, the active component may be configured to deliver an electric charge to a particular output pad 114.

As shown in FIG. 3, the input transformation device 108 includes one or more memories 318. The memory 318 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 318 provides storage of computer-readable instructions, data structures, program modules, and other data for the operation of the input transformation device 108. A few example functional modules are shown stored in the memory 318, although the same functionality may alternatively be implemented in hardware, firmware, or as a system on a chip (SOC).

The memory 318 may include at least one operating system (OS) module 320. The OS module 320 is configured to manage hardware resource devices such as the I/O interfaces 310, the network interfaces 312, the I/O devices 314, and provide various services to applications or modules executing on the processors 304. The OS module 320 may implement a variant of the FreeBSD™ operating system as promulgated by the FreeBSD Project; other UNIX™ or UNIX-like operating system; a variation of the Linux™ operating system as promulgated by Linus Torvalds; the Windows® operating system from Microsoft Corporation of Redmond, Wash., USA; or other operating systems.

Also stored in the memory 318 may be a data store 322 and one or more of the following modules. These modules may be executed as foreground applications, background tasks, daemons, and so forth. The data store 322 may use a flat file, database, linked list, tree, executable code, script, or other data structure to store information. In some implementations, the data store 322 or a portion of the data store 322 may be distributed across one or more other devices including computing devices, network attached storage devices, and so forth.

A communication module 324 may be configured to establish communications with one or more of other input transformation devices 108, user devices 102, the servers 126, or other devices. The communications may be authenticated, encrypted, and so forth. In one implementation, the communication module 324 may be configured to use the photodetectors of the I/O interfaces 310 to receive optically transmitted data from the user device 102. For example, the optically transmitted data may comprise information indicative of the interconnect data 208.

The data store 322 may be configured to store the interconnect data 208, the encoded data 132, and so forth. For example, the communication module 324 may receive the interconnect data 208 from an external device such as the user device 102 or the server 126.

An interconnect matrix configuration module 326 may be stored in the memory 318. The interconnect matrix configuration module 326 is configured to operate the interconnect matrix 112 to implement a particular set of interconnections such as specified by the interconnect data 208. For example, the interconnect matrix configuration module 326 may be configured to access the interconnect data 208 and operate one or more of the semiconductor devices 316 such that a particular pattern of interconnections between the input pads 110 and the output pads 114 is obtained.

The interconnect matrix configuration module 326 may also configure the interconnect matrix 112 to couple one or more of the signal producing components 206 to one or more of the output pads 114. For example, the interconnect matrix configuration module 326 may access the encoded data 132 and select particular output pads 114 for coupling to the signal producing components 206 such that a representation of the encoded data 132 is provided by the output pads 114 during operation.

In some implementations, the interconnect matrix configuration module 326 may be configured to vary the interconnections of the interconnect matrix 112 in a deterministic fashion. For example, a seed value 328 may be used by the interconnect matrix configuration module 326 to produce a subsequent changes in the interconnect matrix 112. Based at least in part on the seed value 328, the interconnect matrix 112 may change over time. For example, the interconnect data 208 as expressed by the interconnect matrix 112 may vary with each individual input value 116 as received, at a particular time interval, and so forth. Continuing the example, the interconnect matrix configuration module 326 may be configured to use different interconnect data 208 every five seconds, with the subsequent pattern of the input interconnect data 208 being based at least in part on the seed value 328. The seed value 328 may be known to, or provided to, the transform module 128 such that the transform module 128 is able to determine the recovered input value 134 or other information.

The interconnect matrix configuration module 326 may also be configured to display or modify the display of the visual indicia 120, such as where the output devices 314(2) include a display device. For example, the interconnect matrix configuration module 326 may reconfigure the interconnect matrix 112 and "shuffle" the corresponding visual indicia 120 to different relative positions on the display of the input transformation device 108 relative to previous uses or a particular sequence. Continuing the example, 10 digit numeric values of 0 to 10 may be "shuffled" such that they are not necessarily in sequential order. Reconfiguration of the visual indicia 120 may improve security by reducing the ability of an attacker to observe a particular pattern of movements and thus discern the user input 116.

In some implementations, the interconnect matrix configuration module 326 may prompt the user to provide user input, and responsive thereto, configure the interconnect matrix 112. For example, the interconnect matrix configuration module 326 may be configured to ask the user to input an access code and, subsequent to the access code, unlocks and configures or enables operation of the interconnect matrix 112.

The memory 318 may include one or more other modules 330. For example, a hash module may be configured to implement a hash function responsive to input values 116 of the user. The data store 322 may be configured to store other data 332 as well. For example, the data store 322 may be configured to store information indicative of an expiration date or time of the interconnect data 208. Continuing the example, the interconnect matrix configuration module 326 may access the expiration data and discontinue use of the particular interconnect data 208 after the expiration date or time. The other data 332 may include, but is not limited to virtual currency, passwords, usernames, account numbers, tokens representative of other data, cryptographic information, and so forth.

The input transformation device 108 may be configured to support one or more "smart card" standards. In one implementation, the input transformation device 108 may be compliant with at least a portion of the smart card specifications as maintained by the International Organization for Standardization (ISO) and the International Electrotechnical Commission (IEC). These standards may include, but are not limited to, at least a portion of ISO/IEC 7816 directed to cards using contacts for data transfer, at least a portion of ISO/IEC 14443 directed to cards using contactless data transmission, and so forth. For example, the input transformation device 108 may be configured to provide one or more functions compliant with the Europay, MasterCard, and Visa (EMV) integrated circuit cards standards as promulgated by the EMVCo, LLC.

Figure 4:
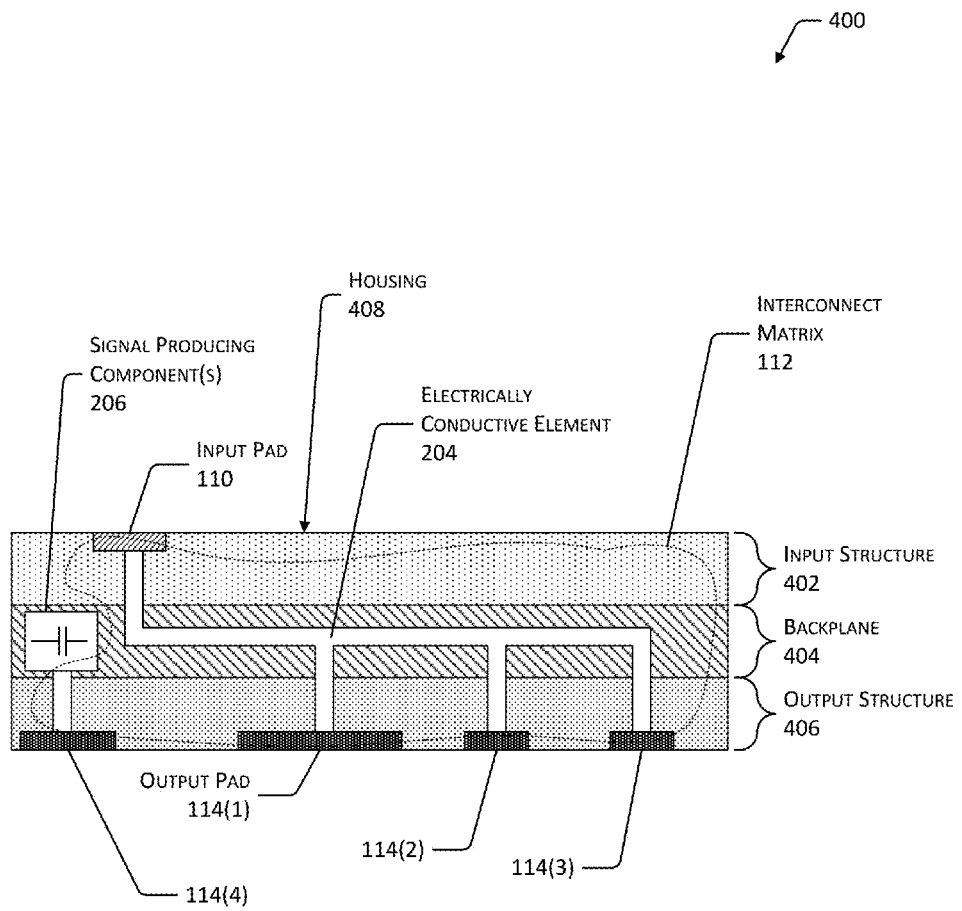
FIG. 4 illustrates a cross section of the input transformation device, according to a first implementation.

FIG. 4 illustrates a cross section 400 of the input transformation device 108, according to a first implementation. In this illustration, an input structure 402 is depicted as coupled to a backplane 404. For example, the input structure 402 may comprise the input pads 110. In one implementation, the input structure 402 may comprise a dielectric or insulator such as polytetrafluoroethylene (PTFE) onto which one or more input pads 110 have been printed or deposited. In some implementations, the visual indicia 120 may be included in the input structure 402, deposited on top of the input structure 402, or may be underneath the input structure 402.

The backplane 404 may be configured to provide mechanical rigidity to the input transformation device 108. For example, the backplane 404 may comprise FR-4 circuit board material made of woven glass and epoxy. Embedded within, or coupled to the backplane 404, may be one or more other components, such as the signal producing components 206. Extending through or around the backplane 404, the one or more electrically conductive elements 204 are configured to transfer at least a portion of an effect received by the input pad 110 to one or more of the output pads 114 by way of the interconnect matrix 112. In other implementations, a chassis or other structure may be configured to provide mechanical support to the components of the input transformation device 108.

Coupled to the backplane 404 is the output structure 406. The output structure 406 may comprise one or more of the output pads 114. In one implementation, the output structure 406 may comprise a dielectric or insulator such as PTFE onto which one or more output pads 114 have been printed or deposited.

The interconnect matrix 112 may be configured to distribute the effect received by the input pad 110 to one or more output pads 114. When the effect is distributed to a plurality of output pads 114, the plurality of output pads 114 may be non-adjacent to one another. For example, the output pads 114 may be located at locations on the output structure 406 such that they are not next to one another. In some implementations, the plurality of output pads 114 may be configured to produce particular shapes or features, such as a square or a triangle comprising a series of output pads 114.

Routing of the electrically conductive elements 204 may be configured to minimize or eliminate one or more effects that may be undesirable to a transfer of the effect associated with the input provided by the user. For example, when the sensor array 104 measures electrical capacitance, the electrically conductive elements 204 may be spaced from one another or routed at right angles to one another where they may cross to minimize parasitic capacitance. In one implementation, the distance that should be maintained between the electrically conductive elements 204, such as circuit traces, is a function of (1) sensitivity of the sensor elements 502 to a change in capacitance ($C_F$) (e.g., the change in capacitance the sensor array 104 should detect to register that a touch has been detected), (2) the dielectric constant of the medium between the traces, and (3) the area of overlap between the traces. In some implementations, the minimum distance (i.e., the distance should be equal to or greater than) that is maintained between adjacent traces is calculated according to:

$$D = \frac{\varepsilon_0 \varepsilon_r A}{C_F},$$

where $\varepsilon_0$ is the tree space permittivity, $\varepsilon_r$ is the dielectric constant of the medium between the traces, A is the area of overlap between the traces, and $C_F$ is the sensor's (e.g., sensor array 104 or the sensor elements 502 thereof) sensitivity to a change in capacitance (e.g., the change in capacitance the sensor array should detect to register that a touch has been detected). The trace routing can also be optimized by reducing the area of overlap and selecting or varying the medium (e.g., air vs. plastic vs. a pure vacuum).

The interconnect matrix 112 may comprise a plurality of electrically conductive elements 204, which are configured to establish a predetermined relationship between at least one input pad 110 and at least one output pad 114. For example, the single input pad 110(1) may be coupled using electrical conductive elements 204 to the plurality of output pads 114(1)-(3).

In some implementations, the input transformation device 108 may comprise a receptacle that is configured to accept the interconnect matrix 112. The interconnect matrix 112 may comprise a removable card or element that expresses the predetermined relationship between the input pads 110 and the output pads 114. The input pads 110 may be coupled using one or more electrically conductive elements 204 to contacts within the receptacle. Similarly, the output pads 114 may be coupled using one or more logically conductive elements 204 to contacts within the receptacle as well. Upon engagement of the interconnect matrix 112 card within the receptacle, the electrical pathway between the input structure 402 and the output structure 406 may be established, connecting at least one input pad 110 to at least one output pad 114. For example, the removable card may be provided to the user, such as included with a shipment, sent via mail, acquired at a facility such as a store, and so forth. In some implementations, the removable card or the input transformation device 108 may include a code that is provided to the server 126 to identify the particular interconnect matrix 112 in use. For example, the removable card may have a machine-readable code such as a two-dimensional barcode that encodes an identifier designating the interconnect data 208 in use. An image of the machine-readable code may be acquired by a camera of the user device 102. In other implementations, data identifying the removable card, the input transformation device 108, or the interconnect data 208 in use may be electronically provided to the user device 102. For example, the output pads 114 as coupled to the signal producing component(s) 206 may be used to send this information to the user device 102.

As described above, in some implementations, the interconnect matrix 112 may comprise one or more semiconductor devices 316. The semiconductor devices 316 may be configured to selectively establish an electrical connection between one or more of the input pads 110 and one or more of the output pads 114. The processor 304 may be configured to control operation of the one or more semiconductor devices 316.

In some implementations, the input structure 402 and the output structure 406 may be printed or deposited directly upon the backplane 404. For example, the backplane 404 may comprise a circuit board having the input pads 110 on one side and the output pads 114 on the other, with the electrically conductive elements 204 comprising pathways extending through the backplane 404 from one side to another.

In other implementations, one or more additional layers may be present. For example, a protective layer configured to provide abrasion resistance during use may be placed atop the input pad 110. In another example, a layer comprising the visual indicia 120 or tactile indicia may be placed atop the input pad 110. In yet another example, the coupling layer may be placed beneath the output structure 406. The coupling layer may comprise an anisotropic material configured to provide electrical conductivity along the Z axis but not along the X or Y axes.

In other implementations where the sensor array 104 is sensitive to other effects such as application of mechanical force or optical effects, the input transformation device 108 may comprise components configured to transfer at least a portion of an effect detectable by the sensor array 104 from the input coordinates 118 to the one or more output pads 114. For example, the sensor array 104 may comprise sensor elements configured to detect optical effects such as an increase or decrease in illumination, optical interference pattern, and so forth. In such an implementation, input pads 110, the interconnect matrix 112, and the output pads 114 may be configured to provide a waveguide for wavelengths of light used by the sensor array 104. Continuing the example, where the sensor array 104 comprises sensor elements configured to detect visible wavelengths of light, the input transformation device 108 may comprise optical fibers configured to direct visible wavelengths of light from the input structure 402 to the output structure 406.

In some implementations, the input transformation device 108 may include a configured to hold or couple to the input structure 402, the backplane 404, the output structure 406, and so forth. For example, the housing 408 may comprise an external shell maintaining the arrangement of the input structure 402, the backplane 404, and the output structure 406. In other implementations, the housing 408 may comprise the assembled input transformation device 108. For example, the input structure 402, the backplane 404, and the output structure 406 may be laminated or otherwise joined together, and thus the exterior portions of the input structure 402, the backplane 404, and the output structure 406 may form the housing 408.

The input transformation device 108 may be manufactured or fabricated using one or more techniques. For example, the interconnect matrix 112 may comprise an insulator such as a circuit board upon which metallic traces are deposited or printed onto. In another example, the interconnect matrix 112 may be printed using electrically conductive inks onto a paper substrate. Different layers of the input transformation device 108 may be constructed separately and then laminated together. As illustrated, the housing 408 may have two opposing sides, such as a first side including the input pads 110 and a second side including the output pads 114. An interior portion, such as the backplane 404 or other components may be arranged between.

Figure 5:
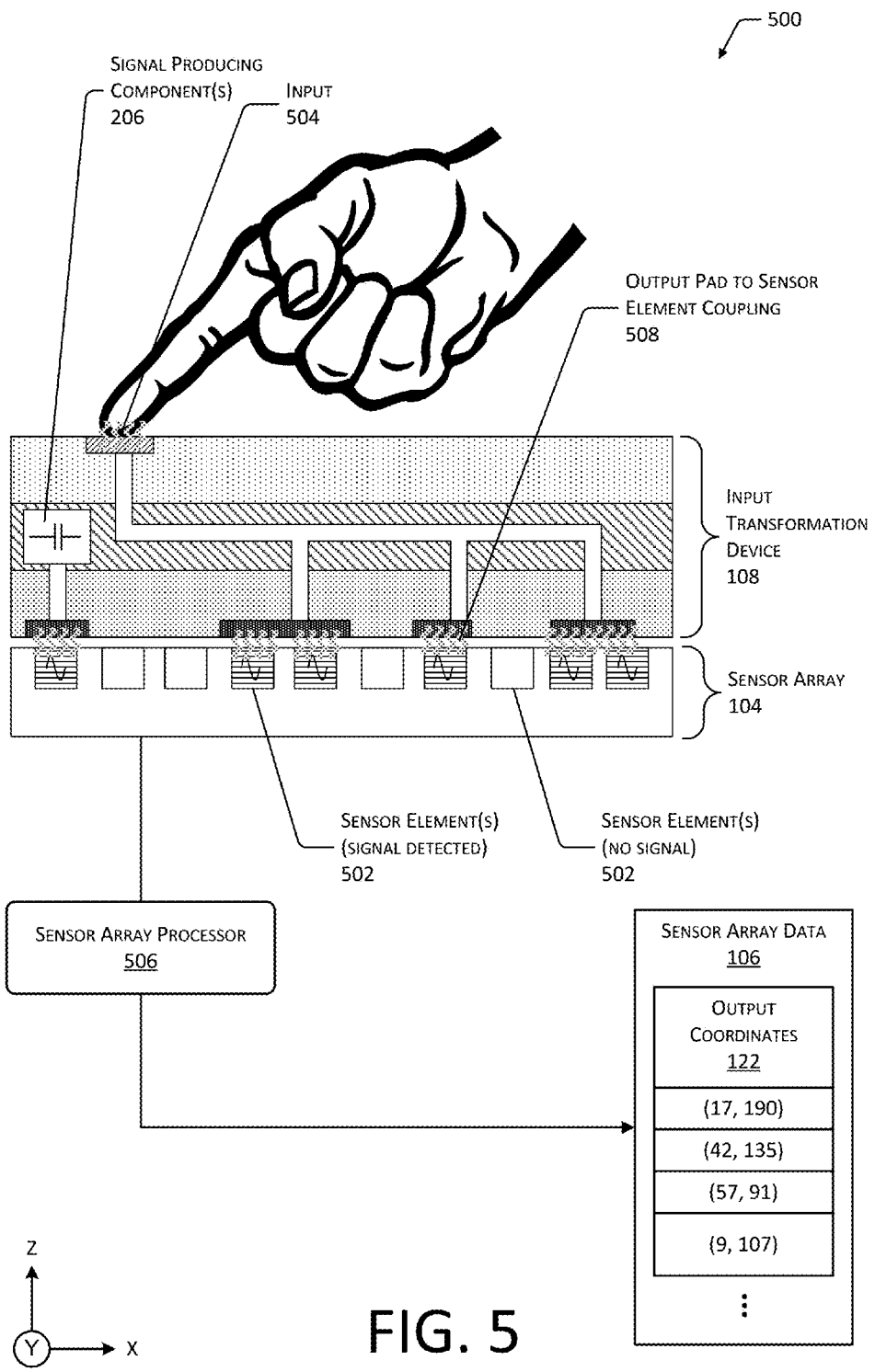
FIG. 5 illustrates a cross section of the input transformation device proximate to the sensor array to produce sensor array data, according to a first implementation.

FIG. 5 illustrates a cross section 500 of the input transformation device 108 proximate to the sensor array 104. As described above, the sensor array 104 may comprise one or more sensor elements 502. The sensor elements 502 are configured to generate a signal responsive to an input 504 that may be provided by the user, such as a touch of a finger, stylus, or other object. For example, the sensor elements 502 may be sensitive to an applied mechanical force, changes in one or more of electrical capacitance, resistance, or inductance, a change in an optical signal, and so forth. The sensor elements 502 may be arranged in various patterns suitable for the desired application. For example, the sensor elements 502 in a sensor array 104 configured for use as a touch sensor may be arranged in a regular pattern of rows and columns.

A sensor array processor 506 is configured to process the signals generated by one or more of the sensor elements 502 and produce the sensor array data 106. For example, the sensor array processor 506 may be configured to scan the sensor elements 502 and generate the output coordinates 122.

The input transformation device 108 as described above is configured to accept the input 504 and transfer at least a portion of an effect associated with the input 504 to one or more of the sensor elements 502. The output pads 114 of the input transformation device 108 may be configured to couple 508 to one or more of the sensor elements 502. The output pad 114 to sensor element 502 coupling 508 may be electromagnetic, mechanical, optical, and so forth. For example, where the sensor element 502 is configured to detect electrical capacitance, electrostatic coupling between the sensor element 502 and the output pad 114 may occur.

As described above, in some implementations, the sensor array 104 may use one or more capacitive techniques to generate a signal indicative of a touch. For example, the sensor elements 502 may use self-capacitance or mutual capacitance to generate a signal.

Self-capacitance measures how much electric charge has accumulated on an object held at a given voltage. Where Q indicates a quantity of charge, C indicates the capacitance, and V indicates the voltage, this relationship may be expressed as the equation (Q=CV). Self-capacitance may be measured by applying a known voltage to an electrode, and then using a circuit to measure how much charge flows to that same electrode. When external grounded objects are brought close to the electrode, additional charge is attracted to the electrode. As a result, the self-capacitance of the electrode increases ($C_S=C_P+C_T$, where $C_S$=self-capacitance, $C_P$=parasitic capacitance, and $C_T$=touch capacitance). For example, the external grounded object may comprise a portion of the user's hand, such as a finger. In this example, the human body acts, electrically, as a capacitor to ground, typically with a capacitance of around 100 picoFarads (pF).

The self-capacitive sensor element 502 may detect touch in one of several ways including, but not limited to, multi-pad construction, rows and columns construction, and so forth. In multi-pad construction, each electrode, or "pad", is individually addressable by the electronics requiring an individual connection between the electrode and the sensor array processor 506. In a row-and-column construction, each row and column is an electrode and may be individually addressed by the sensor array processor 506.

A mutual-capacitance sensor element 502 measures capacitance between two conductors, as opposed to the self-capacitance measurement in which the capacitance of a single conductor is measured. In some mutual-capacitance sensor elements 502, an array of sense electrodes is disposed on a first side of a substrate and an array of drive electrodes is disposed on a second side of the substrate that is opposite the first side. A column or row of electrodes in the drive electrode array is driven to a particular voltage. The mutual capacitance to a single row (or column) of the sense electrode array is measured, and the capacitance at a single row-column intersection is determined. By scanning all the rows and columns, a map of capacitance measurements may be created for the nodes in the grid. When an object such as a user's finger approaches a given intersection, some of the electric field lines emanating from or near the grid point are deflected, thereby typically decreasing the mutual capacitance of the two electrodes at the intersection. Because each measurement probes only a single grid intersection point, no measurement ambiguities arise with multiple touches as is the case of some self-capacitance systems.

As illustrated in FIG. 5, the sensor array 104 may comprise sensor elements 502 configured to determine capacitance. For example, the sensor elements 502 may comprise the mutual capacitance grid intersections described above. The user may come in contact with or be proximate to the input pad 110 of the input transformation device 108. At the corresponding output pads 114 that are coupled to the input pads 110 by way of the electrically conductive elements 204 of the interconnect matrix 112, the sensor element 502 detects a change in electrical capacitance. For example, the body of the user may be equivalent to a capacitor connected to the ground that has been electrostatically coupled to the sensor elements 502. As a result, the capacitance as detected at the sensor element 502 proximate to the output pad 114 changes, resulting in a signal that may be detected by the sensor array processor 506 as a touch.

As described above, in some situations, signal producing components 206 may be used to provide signals to sensor element 502 without input 504. For example, FIG. 5 depicts a signal producing component 206 such as a capacitor that is coupled to an output pad 114.

Figure 6:
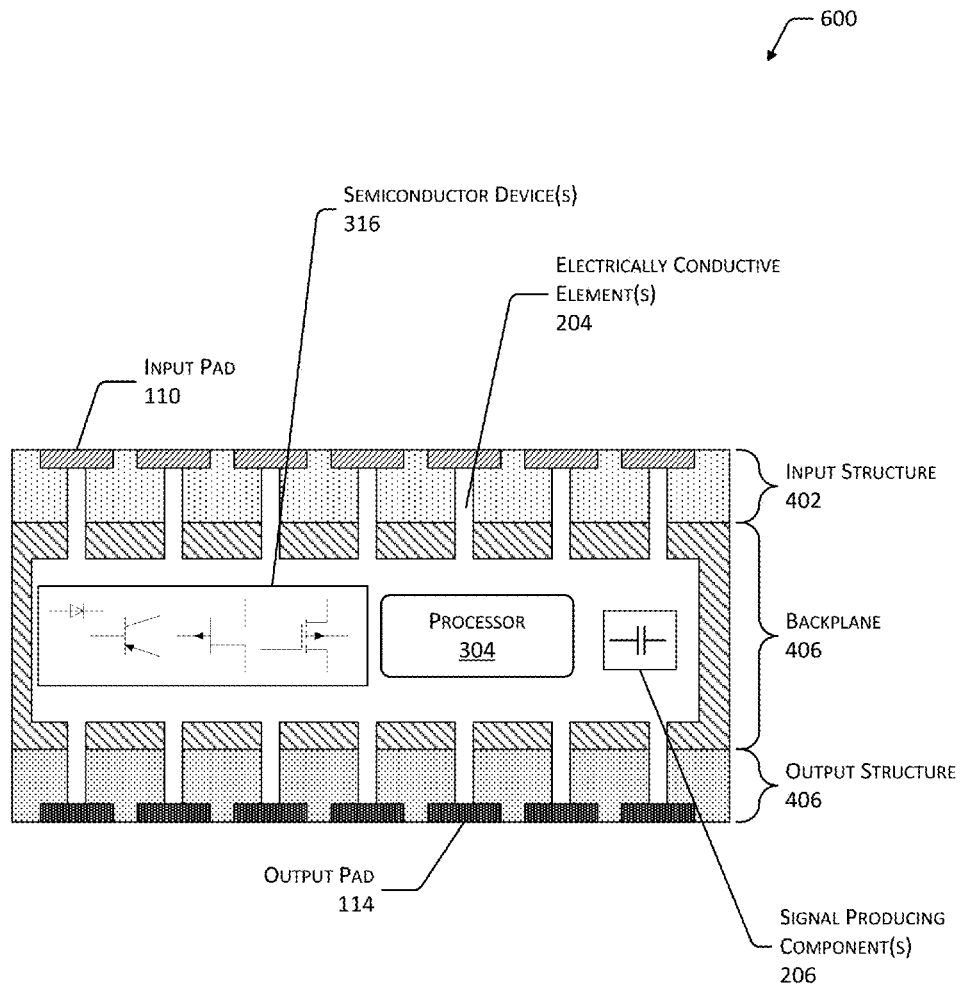
FIG. 6 illustrates a cross section of the input transformation device, according to a second implementation.

FIG. 6 illustrates a cross section 600 of the input transformation device 108, according to a second implementation. As described above, in some implementations, the interconnect matrix 112 may be reconfigurable to implement different sets of interconnects between the input pads 110 and the output pads 114.

In this illustration, the input transformation device 108 includes the processor 304 and semiconductor devices 316. The processor 304 may be configured to control the semiconductor devices 316 such that they may switch connections between different input pads 110 and output pads 114. For example, the processor 304 may receive interconnect data 208 specifying particular input pads 110 are to be associated with particular output pads 114. The interconnect data 208 may also specify particular output pads 114 are to be coupled to signal producing components 206. Responsive to the control of the processor 304, the semiconductor devices 316 may selectively connect or disconnect some input pads 110 to other output pads 114 or signal producing components 216. Thus, the interconnect matrix 112 may be reprogrammable and able to implement different interconnection configurations.

In one implementation, output from the signal producing components 206 may be modulated to transfer data. For example, a time-varying series of signals may be used to encode binary data, with a binary "1" represented by a high signal and a binary "0" represented by an absent or low signal. Using this technique, the input transformation device 108 may transmit data to the sensor array 104. For example, data stored in the memory 318 may be transferred to the user device 102 in this fashion.

In this illustration, the processor 304, the signal producing component(s) 206, and the semiconductor device(s) 216 are depicted as within the backplane 406. In other implementations, these components may be disposed on a surface of the backplane 406 or elsewhere in the input transformation device 108.

Figure 7:
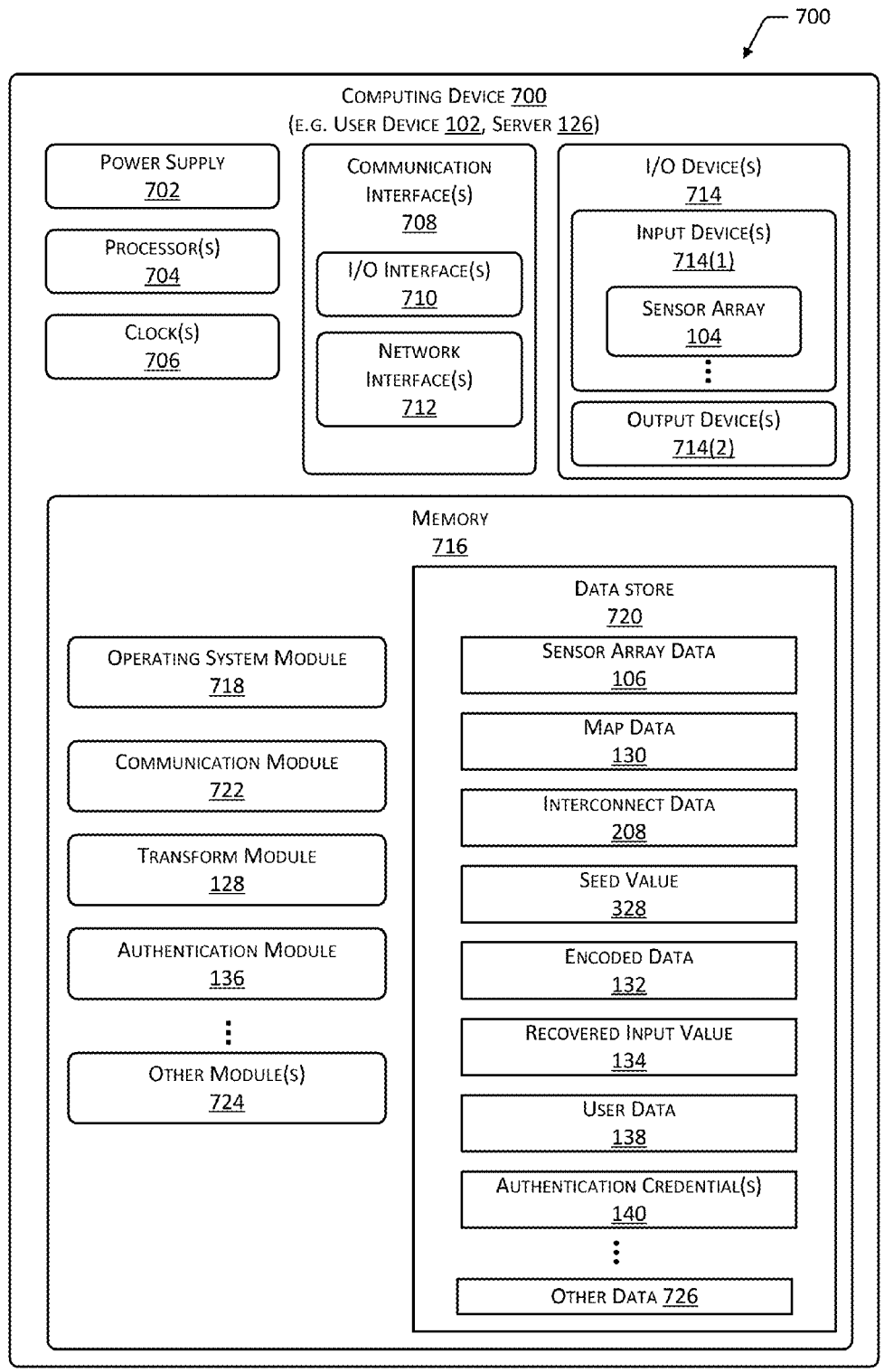
FIG. 7 illustrates a block diagram of a computing device, such as a user device to which the sensor array is coupled or a server, according to one implementation.

FIG. 7 illustrates a block diagram 700 of a computing device, such as the user device 102 to which the sensor array 104 is coupled or the server 126, according to one implementation.

The computing device 700 may comprise one or more power supplies 702 configured to provide electrical power suitable for operating the components in the computing device 700 that require power. In some implementations, the power supply 702 may comprise a rechargeable battery, fuel cell, photovoltaic cell, power conditioning circuitry, wireless power coupling, kinetic energy harvester, and so forth.

The computing device 700 may include one or more hardware processors 704 (processors) configured to execute one or more stored instructions. The processors 704 may comprise one or more cores. In some implementations, the processors 704 may comprise microcontrollers, discrete electronic circuitry, and so forth. One or more clocks 706 may provide information indicative of date, time, ticks, and so forth. For example, the processor 704 may use data from the clock 706 to generate a timestamp, trigger a preprogrammed action, and so forth.

The computing device 700 may include one or more communication interfaces 708 such as I/O interfaces 710, network interfaces 712, and so forth. The communication interfaces 708 enable the computing device 700, or components thereof, to communicate with other devices or components. The communication interfaces 708 may include one or more I/O interfaces 710. The I/O interfaces 710 may comprise interfaces such as I2C, SPI, USB, RS-232, and so forth.

The I/O interface(s) 710 may couple to one or more I/O devices 714. The I/O devices 714 may include input devices 714(1), such as the sensor array 104, fingerprint sensors, keyboards, microphones, buttons, and so forth. The I/O devices 714 may also include output devices 714(2) such as one or more of a display, audio speakers, printers, and so forth. In some embodiments, the I/O devices 714 may be physically incorporated with the computing device 700 or may be externally placed.

In one implementation, the I/O interface 710 may comprise one or more photodetectors, one or more lights including, but not limited to, LEDs, and so forth. The computing device 700 may be configured to exchange information with the input transformation device 108 using optical transmission.

The network interfaces 712 are configured to provide communications between the computing device 700 and other devices, such as the user device 102, the server 126, and so forth. The network interfaces 712 may include devices configured to couple to PANs, LANs, WANs, and so forth. For example, the network interfaces 712 may include devices compatible with Ethernet, Wi-Fi™, Bluetooth®, ZigBee®, Z-Wave, 3G, 4G, LTE, and so forth.

The computing device 700 may also include one or more busses or other internal communications hardware or software that allow for the transfer of data between the various modules and components of the computing device 700.

As shown in FIG. 7, the computing device 700 includes one or more memories 716. The memory 716 comprises one or more CRSM as described above. The memory 716 provides storage of computer-readable instructions, data structures, program modules, and other data for the operation of the computing device 700. A few example functional modules are shown stored in the memory 716, although the same functionality may alternatively be implemented in hardware, firmware, or as a SOC.

The memory 716 may include at least one OS module 718. The OS module 718 is configured to manage hardware resource devices such as the I/O interfaces 710, the network interfaces 712, the I/O devices 714, and provide various services to applications or modules executing on the processors 704. The OS module 718 may implement a variant of the FreeBSD™ operating system as promulgated by the FreeBSD Project; other UNIX™ or UNIX-like operating system; a variation of the Linux™ operating system as promulgated by Linus Torvalds; the Windows® operating system from Microsoft Corporation of Redmond, Wash., USA; or other operating systems.

Also stored in the memory 716 may be a data store 720 and one or more of the following modules. These modules may be executed as foreground applications, background tasks, daemons, and so forth. The data store 720 may use a flat file, database, linked list, tree, executable code, script, or other data structure to store information. In some implementations, the data store 720 or a portion of the data store 720 may be distributed across one or more other devices including other computing devices 700, network attached storage devices, and so forth.

A communication module 722 may be configured to establish communications with one or more of the input transformation device 108, user devices 102, servers 126, or other devices. The communications may be authenticated, encrypted, and so forth. In one implementation, the communication module 722 may be configured to use the display to transmit data optically to the input transformation device 108. For example, the optically transmitted data may comprise information indicative of the interconnect data 208.

The data store 720 may be configured to store one or more of the sensor array data 106, the map data 130, the interconnect data 208, the seed value 328, the encoded data 132, the recovered input value 134, the user data 138, or the authentication credentials 140.

As described above, the transform module 128 may be configured to use the sensor array data 106 to generate one or more of the encoded data 132 or recovered input data 134.

As described above, in some implementations, the interconnect data 208 may be generated based at least in part on the seed value 328. For example, the seed value 328 may be provided to a deterministic function. A deterministic function is one that produces the same output given a particular input. Continuing the example, the output from the deterministic function may be used to generate the interconnect data 208 indicating which input pads 110 are connected to which output pads 114, if any.

In one implementation, the computing device 700 may provide the interconnect data 208 to the input transformation device 108. For example, the computing device 700 may modulate light from the display to encode the interconnect data 208. The modulated light may then be detected by photodetectors of the input transformation device 108.

In another implementation, the computing device 700 and the input transformation device 108 may receive a seed value 328 from the other device, from a third-party device, or based on a commonly known value. For example, the seed value 328 may be based on a time value generated by the clock 706. In some implementations, the transform module 128 may be configured to generate the interconnect data 208 based on the seed value 328. For example, given a particular seed value 328 as input, a particular set of interconnect data 208 may be produced.

Based at least in part on information provided by the transform module 128, the authentication module 136 may be configured to generate the authentication credentials 140. For example, the recovered input value 134 may be compared with information stored in user data 138. Continuing the example, where the comparison indicates a match, the authentication credentials 140 may be provided.

The memory 716 may include one or more other modules 724. For example, a hash module may be configured to implement a hash function responsive to input values 116 such as the recovered input value 134, the user data 138, and so forth. The data store 720 may be configured to store other data 724 as well. For example, the data store 720 may be configured to store information indicative of an expiration date or time of the interconnect data 208. Continuing the example, the transform module 128 may access the expiration data and discontinue use of the particular interconnect data 208 after the expiration date or time.

Illustrative Processes

Figure 8:
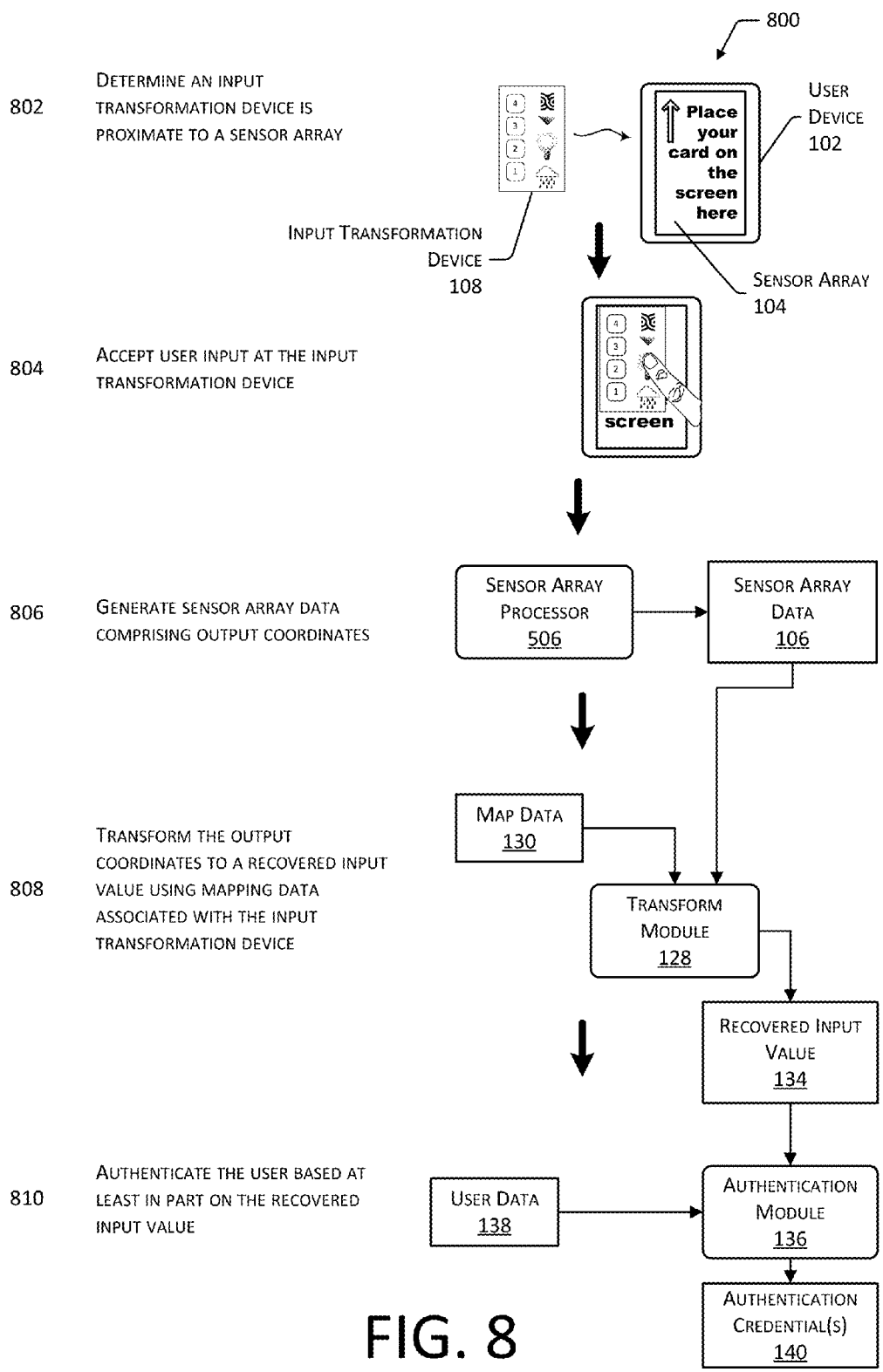
FIG. 8 illustrates a scenario of using the input transformation device to produce sensor array data for authentication, according to one implementation.

FIG. 8 illustrates a scenario 800 of using the input transformation device 108 to produce sensor array data 106 for authentication, according to one implementation. The input transformation device 108 may be used to authenticate a user. For example, the user may wish to provide payment for a good or service, or access particular information or a service on the user device 102 or the server 126.

At 802, the user device 102 determines an input transformation device 108 is proximate to the sensor array 104. For example, an application executing on the user device 102 may look for a predetermined pattern of output coordinates 122 as indicated in the sensor array data 106. Based at least in part on the presence of the predetermined pattern in the sensor array data 106, the input transformation device 108 may be determined to be proximate to the sensor array 104.

In another implementation, the determination may be made by the user providing input to the sensor array 104. For example, where the sensor array 104 comprises part of the touchscreen, the user may activate a control presented on the touchscreen indicating that the input transformation device 108 is to be used.

In some implementations, the user device 102 may provide a prompt to the user to place the input transformation device 108 at a particular orientation relative to the sensor array 104. For example, the user device 102 may present on the touchscreen display an arrow indicating that the input transformation device 108 is to be placed rotated 90° to the right as indicated in this illustration. The user may respond to this prompt and use the input transformation device 108 in that orientation. In another implementation, the user may select the orientation from the user's own memory and place the input transformation device 108 on the sensor array 104 without prompting. In another example, the user device 102 may present a border on the touchscreen display, within which the input transformation device 108 may be placed.

Instead of, or in addition to the orientation of the input transformation device 108 with respect to the sensor array 104, in some implementations, a particular placement of the input transformation device 108 with respect to the sensor array 104 may be used to provide information or further increase the entropy of the system 100. For example, where the input transformation device 108 has a physically smaller surface area than the sensor array 104, such as depicted here, the user may place the input transformation device 108 to cover different portions of the sensor array 104. Continuing the example, as depicted here, the input transformation device 108 is placed such that the top and left sides of the input transformation device 108 are proximate to the top and left sides of the sensor array 104. In some implementations, placement of the input transformation device 108 at a different location on the sensor array 104, such as at the bottom right corner, may be used to provide other information or increase the entropy of the system 100. For example, placement of the input transformation device 108 at the bottom right corner of the sensor array 104 may generate sensor array data 106, which may be processed by the transform module 128 to determine that the user is under duress.

At 804, the input transformation device 108 accepts input. For example, the user may touch one or more of the input pads 110 of the input transformation device 108.

At 806, the sensor array data 106 is generated comprising output coordinates 122. For example, the sensor array processor 506 may produce the sensor array data 106 indicating the output coordinates 122.

At 808, the output coordinates 122 are transformed to a recovered input value 134 using the map data 130 associated with the input transformation device 108. For example, the transform module 128 may use the output coordinates 122(1)-(3) and the map data 130 to determine the recovered input value 134 is the "bulb" icon.

At 810, the user may be authenticated based at least in part on the recovered input value 134. For example, the recovered input value 134 of the "bulb" icon may be compared with previously stored user data 138 that indicates the secret password to authenticate the user is the value "bulb" icon. Once authenticated, authentication credentials 140 may be generated. The authentication credentials 140 may be used to perform one or more actions, such as authorizing a payment, allowing access to user device 102, allowing access to a service, and so forth. For example, the authentication credentials 140 may authorize access to information stored by the server 126.

In one implementation, the user may provide the input of 802 responsive to a prompt from one or more of the user device 102 or the input transformation device 108. For example, information may be presented to the user, such as a sequence of characters or icons. The user may see and enter the sequence as input 116 using the input pads 110. In another implementation, the input from the user may be used to reconfigure the interconnect matrix 112.

In another implementation, the input transformation device 108 may be configured to operate responsive to receiving information from the user device 102. For example, the user may be attempting to authenticate a transfer of funds, such as to pay for goods or services. The user device 102 may send information to the input transformation device 108, such as data about the amount of the transaction. Responsive to this information, operation of the input transformation device 108 may be affected. For example, entry of an amount to transfer at the input pads 110 that does not match that received from the user device 102 may result in the deactivation of the interconnect matrix 112, generation of a duress code, or other actions.

In another implementation, the input transformation device 108 may be configured to authenticate the user device 102 prior to activating the interconnect matrix 112 or otherwise providing output to the output pads 114. For example, the input transformation device 108 may interrogate the user device 102 and authenticate the user device 102 is authorized to receive input from the input transformation device 108.

In some implementations, data is received that is cryptographically verifiable by the input transformation device 108, or the input transformation device 108 may generate data that is cryptographically verifiable by the user device 102 or another device such as the server 126. For example, the data may be encrypted so as to be decryptable by the system that will cryptographically verify the data, where the ability to decrypt the data serves as cryptographic verification of the data. As another example, the data may be digitally signed (thereby producing a digital signature of the data) such that the digital signature is verifiable by the system that will cryptographically verify the data. In other examples, both encryption and digital signatures are used for cryptographic verifiability (and security). A key may be used to encrypt, digitally sign, or encrypt and digitally sign the data in accordance with various implementations. The same key is not necessarily used for both encryption and digital signing, where applicable. In some implementations, a key used to encrypt the data is a public key of a public/private key pair where the private key of the key pair is maintained securely by the system to which the data is to be provided, thereby enabling the system to decrypt the data using the private key of the key pair. Using the public key to encrypt the data may include generating a symmetric key, using the symmetric key to encrypt the data, and encrypting the symmetric key using the public key, where the encrypted symmetric key is provided to a system with the encrypted data to enable the system to use the corresponding private key to decrypt the symmetric key and use the decrypted symmetric key to decrypt the data. Further, in some embodiments, the data may be digitally signed using a private key of a public/private key pair corresponding to the device that encrypts, digitally signs, or encrypts and digitally signs the data. Other variations, including variations where a symmetric key shared between the input transformation device 108 and the system that cryptographically verifies the data is used to encrypt, digitally sign, or encrypt and digitally sign the data. The EMV chip in the input transformation device 108 may be used for any of these steps. The data may be implemented as a file, a digital artifact, or both. For example, the data may be an eXtensible Markup Language (XML) or JavaScript Object Notation (JSON) file or artifact that is readable by a browser control, native code, ActiveX, or other software, possibly through use of an application program interface (API).

Figure 9:
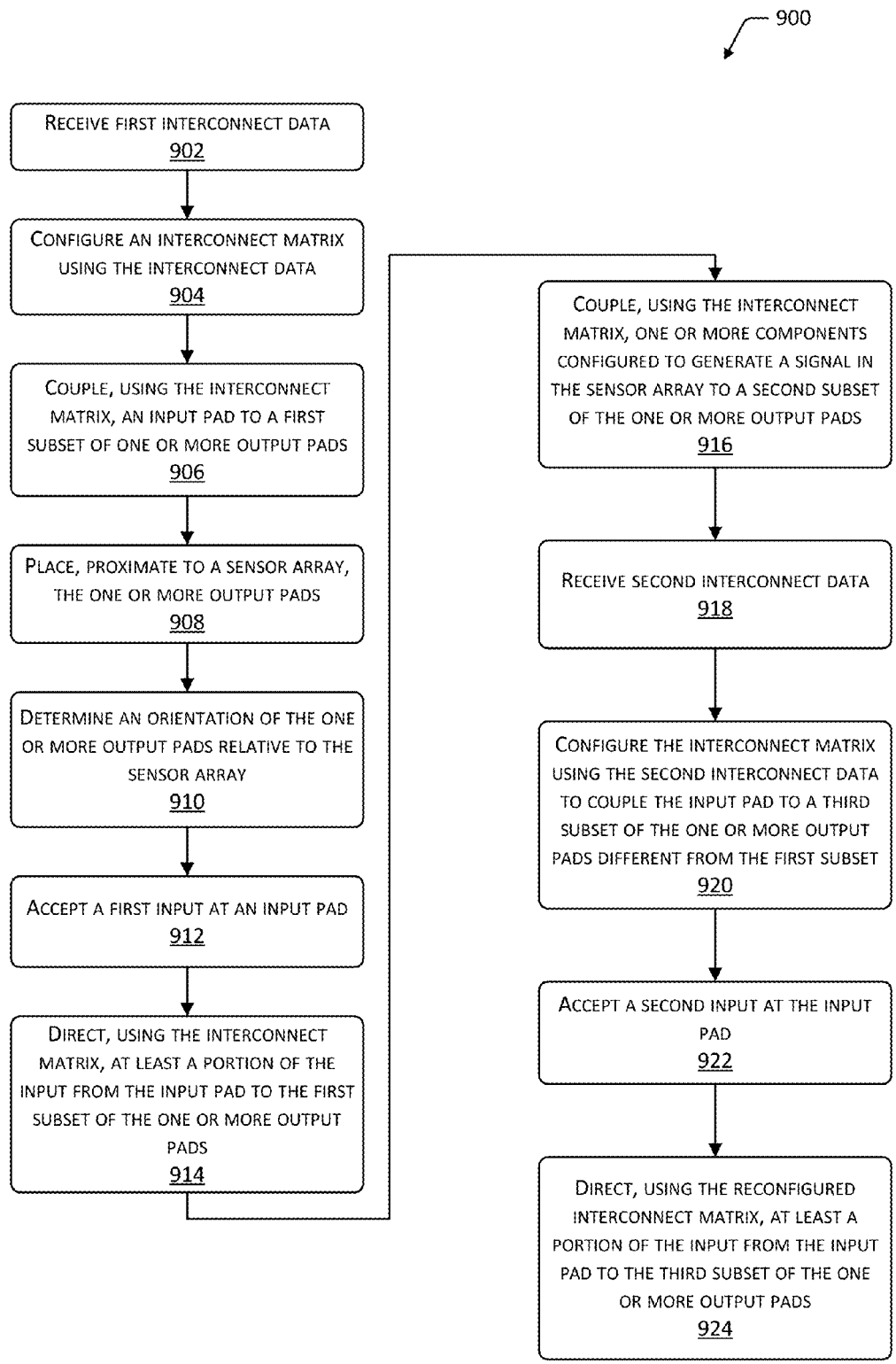
FIG. 9 is a flow diagram of a process of configuring and using an input transformation device, according to one implementation.

FIG. 9 is a flow diagram 900 of a process of configuring and using an input transformation device 108, according to one implementation. In some implementations, the process may be performed at least in part by the user device 102, input transformation device 108, or the server 126.

Block 902 receives or accesses first interconnect data 208. For example, the input transformation device 108 may receive the first interconnect data 208 using one or more of the communication interfaces 308.

Block 904 configures an interconnect matrix 112 using the first interconnect data 208. For example, the interconnect matrix configuration module 326 as executed by the processor 304 may use the first interconnect data 208 to control operation of one or more semiconductor devices 316.

Block 906 couples, using the interconnect matrix 112, one or more of the input pads 110 to a first subset of one or more of the output pads 114. For example, the electrically conductive elements 204 as switched by the semiconductor devices 316 may establish electrical pathways between the one or more input pads 110 and the one or more output pads 114.

Block 908 places, proximate to the sensor array 104, the one or more output pads 114. For example, the user may place the input transformation device 108 upon the surface of the sensor array 104.

Block 910 determines an orientation of the input transformation device 108, or the pads thereupon, relative to the sensor array 104. For example, the pattern of output coordinates 122 provided by the input transformation device 108 may be detected by the sensor array 104. An application executing at least in part on the user device 102 may process the sensor array data 106 and determine the orientation of the input transformation device 108. In another implementation, the user may manually input the orientation. In yet another implementation, the orientation may be determined based on retrieval from previously stored value.

Block 912 accepts a first input 504 at the input pad 110. For example, the user may touch or bring their finger close to the input pad 110(1).

Block 914 directs, using the interconnect matrix 112, at least a portion of the input 504 or an effect associated therewith from the input pad 110 to the first subset of the one or more output pads 114. For example, the change in logical capacitance associated with the user's body coming into contact with the input pad 110(1) may be distributed to the output pads 114(1)-(3).

As described above, in some implementations, the output pads 114 may be coupled to signal producing components 206. The signals generated in the sensor array 104 and expressed in the sensor array data 106 may be used to transfer encoded data 132.

Block 916 couples, using the interconnect matrix 112, one or more of the signal producing components 206 to a second subset of the one or more output pads 114. As a result of the coupling, the second subset of the one or more output pads 114 produces signals in the sensor elements 502 of the sensor array 104. The particular configuration of the second subset may be used to store the encoded data 132. In some implementations, the interconnect matrix 112 may be used to couple the signal producing components 206 to the second subset of the one or more output pads 114. In other implementations, the signal producing components 206 may be directly connected to the second set of output pads 114 or may be positioned in place of the output pads 114.

As described above, in some implementations, the interconnect matrix 112 may be reconfigurable. For example, the interconnect matrix 112 may be reconfigured using interconnect data 208.

Block 918 receives or accesses second interconnect data 208. For example, the second interconnect data 208 may be retrieved from the memory 318 following generation by the interconnect matrix configuration module 326 using the seed value 328.

In one implementation, the interconnect data 208 may be changed such as subsequent to each input accepted by the input transformation device 108, at predetermined intervals, or upon occurrence of another predefined event.

Block 920 configures interconnect matrix 112 using the second interconnect data 208. For example, the second interconnect data 208 may be configured to couple the input pad 110 to a third subset of the one or more output pads 114. The third subset may be different from the first subset.

Block 922 accepts a second input at the input pad 110. Block 924 directs, using the reconfigured interconnect matrix 112, at least a portion of the input 504 from the input pad 110 to the third subset of the one or more output pads 114. As a result of the reconfiguration of the interconnect matrix 112, the same input 504 made to the same input pad 110 may result, at a later time, in different output pads 114 at different output coordinates 122 on the sensor array 104 generating signals at sensor elements 502.

Figure 10:
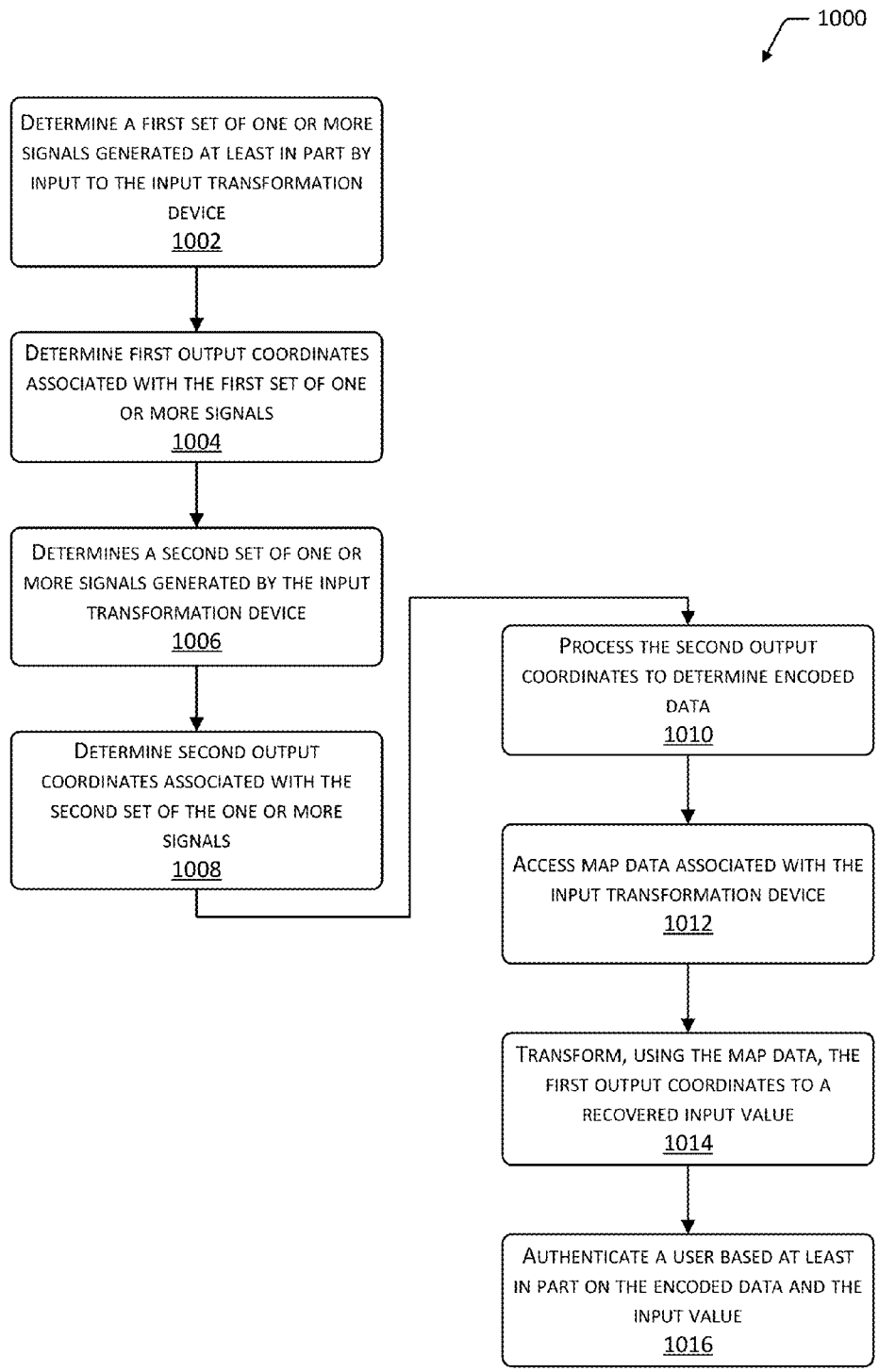
FIG. 10 is a flow diagram of a process of authenticating a user with an input transformation device, according to one implementation.

FIG. 10 is a flow diagram 1000 of a process of authenticating a user with an input transformation device 108, according to one implementation. In some implementations, the process may be performed at least in part by the user device 102, input transformation device 108, or the server 126.

Block 1002 determines a first set of one or more signals generated at least in part by input to the input transformation device 108. For example, at least a portion of an effect associated with the input 504 as provided by the user may be transferred by the input transformation device 108 from the input pad 110 to one or more of the output pads 114. Based at least in part on the output pad 114 to sensor element coupling 508, at least a portion of the effect of the input 504 may generate a signal in the sensor element 502.

Block 1004 determines a first set of output coordinates 122 associated with the first set of one or more signals. For example, the sensor array processor 506 may scan across the sensor elements 502 and generate output coordinates 122.

Block 1006 determines a second set of one or more signals generated by the input transformation device 108. For example, the second set of one or more signals may be generated by one or more of the signal producing components 206 coupled to, or in place of, one or more of the output pads 114.

Block 1008 determines a second set of output coordinates 122 associated with the second set of the one or more signals.

Block 1010 processes the second output coordinates 122 to determine encoded data 132. As described above, the encoded data 132 may comprise one or more of: an indicia of orientation of the input transformation device 108 relative to the sensor array 104, or information indicative of the configuration of the interconnect matrix 112 such as the interconnect data 208. For example, the second output coordinates 122 may encode a serial number of the interconnect data 208 used to configure the interconnect matrix 112.

In another implementation, the encoded data 132 may comprise at least a portion of the authentication credentials 140. For example, the encoded data 132 may comprise a cryptographically secured string that may be used as the authentication credentials 140. In another example, the encoded data 132 may be combined with, or otherwise processed using other data to generate the authentication credentials 140.

Block 1012 accesses map data 130 associated with the input transformation device 108. Continuing the example, the encoded data 132 may be used to retrieve the interconnect data 208 used by the input transformation device 108.

Block 1014 transforms, using the map data 130, the first set of output coordinates 122 to one or more recovered input values 134. Continuing the example, the map data 130 may be retrieved using the encoded data 132 indicative of the interconnect data 208.

Block 1016 authenticates one or more of the user, the input transformation device 108, or the user device 102, based at least in part on one or more of the encoded data 132 or the recovered input value 134. For example, the authentication may comprise comparing the recovered input value 134 with at least a portion of the user data 138.

The input transformation device 108 as described may be used in a variety of situations. For example, the input transformation device 108 may be used as part of a distribution mechanism for stored value cards, such as gift cards or pre-paid credit cards. In another implementation, the input transformation device 108 may be used to provide input to devices such as vehicles, drones, building access control systems, security systems, office appliances, industrial equipment, and so forth. For example, the input transformation card 108 may be used to authenticate the user to provide access to particular rooms within a facility.

Figure 11:
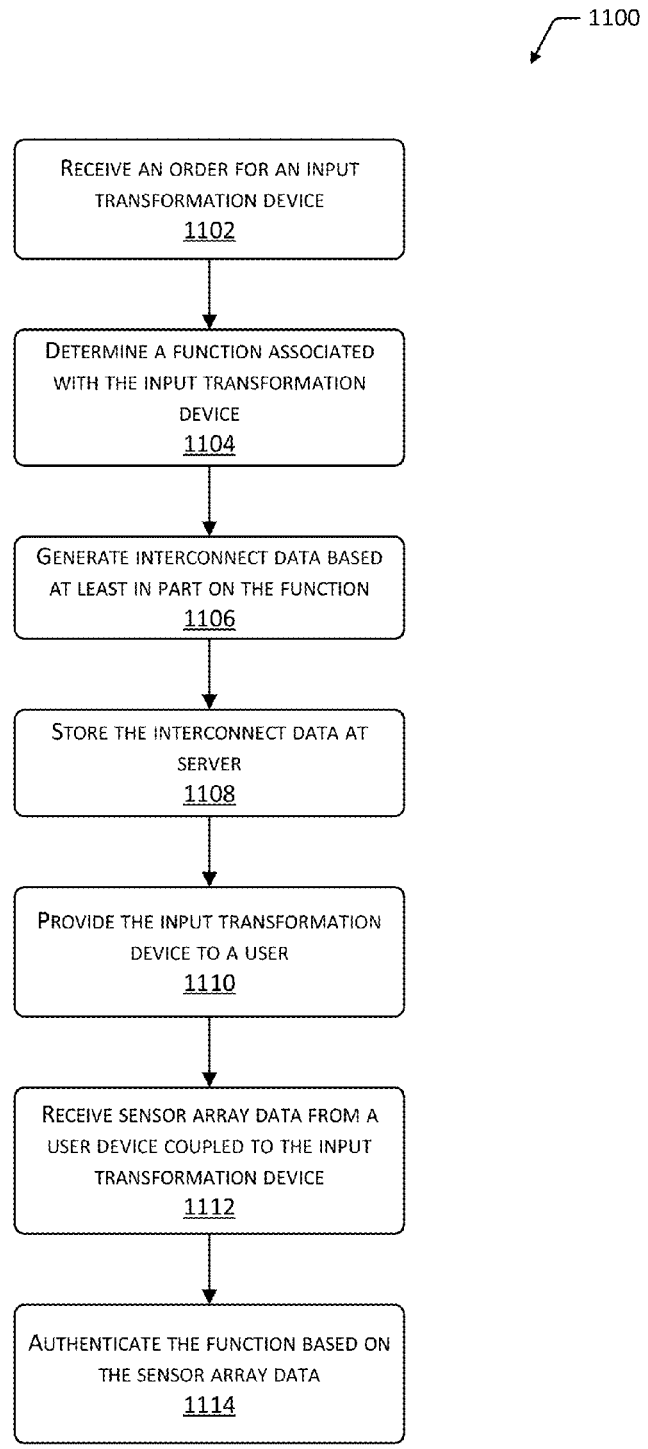
FIG. 11 is a flow diagram of making and using an input transformation device, according to one implementation.

FIG. 11 is a flow diagram 1100 of making and using an input transformation device 108, according to one implementation. In some implementations, the process may be performed at least in part by the user device 102, input transformation device 108, or the server 126.

At 1102, an order for an input transformation device 108 is received. For example, an online merchant may receive an order via a web interface for an input transformation device. In another example, the order for the input transformation device 108 may be automatically generated, such as part of a routine order fulfillment workflow.

At 1104, a function associated with the input transformation device 108 is determined. The function may include one or more of: processing a personal identification number (PIN), selecting from a set of command options, receiving mixed numeric and alphabetic input, providing authentication credentials, authenticating a user device, authenticating a user, initiating a payment with another entity (e.g., a merchant or a person-to-person payment), and so forth. As described above, information such as frequently performed transactions (transfer money between accounts, pay bills, etc.) may be stored as encoded data 132 on the input transformation device 108.

Other functions that the input transformation device 108 may implement include, but are not limited to one or more of: initiating password input (e.g., the input transformation device 108 may comprise a password manager and store user passwords) to gain access to user device 102 or an application running on or accessible by the user device 102 (e.g., an app. on the device or web service accessible by browser of device), controlling the function of particular devices that incorporate a touch sensitive screen (e.g., user can select frequently performed functions on their camera, user's workplace identification badge programmed to perform specific work related functions such as copier functions, access control function, functions the user regularly performs via their work computer (open certain applications; log into certain services, etc.), vending machine functions, industrial machine controls, etc.), or conducting a transaction with one or more merchants. For example, as described above, the encoded data 132 may include information indicative of recommendations or upsell hints to merchants for use at point of sale (POS). As also described above, the encoded data 132 may include data indicative of categories of interests of the user that may be subsequently used to provide recommendations or present information to the user. Continuing the example, the encoded data 132 may indicate one or more categories indicative of a type of customer, such as a loyal customer (who frequents a certain retailer), discount customer (who typically looks for large discounts), impulse customers (who may not have a specific set of items they want to buy), need-based customers (who typically have a specific list of items and thus for which upsells are deemed ineffective), or wandering customers (such as those who like to buy what other people are buying). The categories may be based on one or more of: purchase price (buys products over certain amount or under certain amount); categories based on types of products/services customer typically purchases (e.g., electronics, music, type of music, sports, clothing, kids toys, etc.), and so forth.

During operation, use of the input transformation device 108 may result in the user device 102 of a merchant presenting relevant ads, messages to the merchant-clerk to provide upsell hints, use limitation (e.g., parental controls—such as children are not permitted to purchase candy or movies with a rating of PG or higher, etc.) and so forth. As described above, the encoded data 132 may be stored in the memory 318 and may be provided to the user device 102 using the signal producing components 206, particular arrangement of the output pads 114 during use, and so forth. For example, the output-side of the input transformation device 108 may be divided into certain sectors, which may be disjoined or non-adjacent. A particular sector may correspond to the categories mentioned above. When the user enters their PIN or selects a certain input pad 110, based on the category as encoded by the input transformation device 108, particular output pads 114 of the particular sector may be used, providing information indicative of that category. For example, the user may be a sports fan who makes a purchase at a store by placing their card on the user device 102 of a merchant. The user may input their PIN using the input transformation device 108, and the user device 102 may recognize that a threshold number of individual output pads 114 corresponding to the particular sector of the input transformation device 108 were activated responsive to the user input 116. Based on this correspondence, the user device 102 or another device such as the server 126 may determine the category, such as "sports fan". As a result, the merchant-clerk may then provide an upsell hint, such as notifying the user that store has a new book on their favorite player in stock and that the book is on sale.

In some implementations, the function may be determined based on information such as past purchases of the user, user demographics, account type of the user, and so forth. For example, where the past purchases indicate the user has a history of purchasing items over a threshold value, the function may be determined to be authentication of the user, to prevent potential fraud or abuse on the account of the user.

At 1106 interconnect data 208 based at least in part on the function may be generated. For example, the interconnect data 208 associated with user authentication may be generated using a random number of a minimum predetermined length. The generation may involve determining what the interconnect data 208 will be used for and determining the minimum entropy specified for that use. In some implementations, generation of the interconnect data 208 may be based at least in part on the user device 102 for which the input transformation device 108 may be used. For example, the sensor array 104 of the user device 102 may be able to detect 10 simultaneous touches and so the interconnect data 208 may associate a single input pad 110 with up to 10 output pads 114. In another example, where the sensory array 104 is able to detect 100 simultaneous touches, the interconnect data 208 may associate a single input pad 110 with up to 100 output pads 114.

As described above, routing of the electrically conductive elements 204 or other elements of the interconnect matrix 112 may be configured to reduce or minimize effects such as parasitic capacitance.

The area and placement of the input pads 110 may be based at least in part on user-selected or user-specific parameters. For example, the user may specify that they prefer larger buttons to improve accessibility. As a result, the input pads 110 may be so arranged with an appropriately sized area to facilitate this accessibility.

As described above, use of particular output pads 114, such as in predetermined sectors, may be used to store or convey the encoded data 132. The encoded data 132 may be encoded as a particular pattern of "touches" that are detected by the sensor array 104 without input from the user. These recommendations may be used to present information on the user device 102 such as advertisements, upsell advice, and so forth.

Returning to the earlier example of the user having category information of "sports fan", the input transformation device 108 associated with that user may have the output pads 114 in the particular sector associated with the category of "sports fan" active. In another example, an input transformation device 108 of another user designated in the category of "audiophile" may have a different sector of the output pads 114 in use. Other encoded data 132 may include workplace access control information, allergies, designation of types of purchases authorized on a gift card, and so forth.

In some implementations, overall dimensions of the input transformation device 108 may be considered during manufacture. For example, a larger input transformation device 108 may have more surface area for more output pads 114, relative to a smaller input transformation device 108.

The input transformation device 108 may be sized in accordance with ISO/IEC 7810:2003 specification. For example, the input transformation device 108 may have dimensions corresponding to a banking card and ID card (ATM card, credit card, debit card, driver's license, business card, etc.) at approximately 85.60 mm by approximately 53.98 mm by approximately 0.76 mm. For smartcards with contacts see ISO/IEC 7816. See ISO/IEC 7810, ISO/IEC 7811, ISO/IEC 7812, ISO/IEC 7813, ISO 8583, and ISO/IEC 4909 for magnetic stripe cards. Overall dimensions can also be selected based on the user device 102 the input transformation device 108 will be used with, such as the size of the sensor array 104 for which the input transformation device 108 is to be used, and so forth.

Any one of the factors discussed above could generate configuration of the interconnect matrix 112. An optimization process may utilize these factors and determine a version optimized for one or more parameters. For example, the configuration of the interconnect matrix 112 may be configured to maximize the number of available different types of input values 116 that that may be accepted by the input transformation device 108 which represents each of those input values 116 with at least ten different output coordinates 122.

At 1108 the interconnect data 208 is stored, such as at the server 126.

At 1110, the input transformation device 108 is provided to the user. For example, the input transformation device 108 may be manufactured or programmed to encode the interconnect data 208. In some implementations, input transformation devices 108 may be manufactured in advance for particular types of functions and then retrieved for use and associated with the user. For example, ten-thousand input transformation devices 108 may be manufactured in a lot, each encoding different interconnect data 208. At shipment, the particular input transformation devices 108 may be associated with the particular user.

In some implementations, information used to construct or print the input transformation devices 108 may be provided to the user instead of physical delivery. For example, information for printing the particular input transformation devices 108 using a three-dimensional printer may be delivered using the network 124 to the three-dimensional printer of the user. Blocks 1102 through 1110 thus describe a process of manufacturing and providing the input transformation device 108. In some implementations, the process may stop at block 1110.

At 1112, sensor array data 106 is received from the user device 102 coupled to the input transformation devices 108. For example, the user may be attempting to use the functionality of authenticating a purchase having a cost over the threshold value.

At 1114, the function is authenticated based on the sensor array data 106. For example, the sensor array data 104 may describe output coordinates 122 corresponding to those associated with map data 130 based on the interconnect data 208. Continuing the example, given the proper correspondence, the purchase may be authenticated and authorized to proceed.

Figure 12:
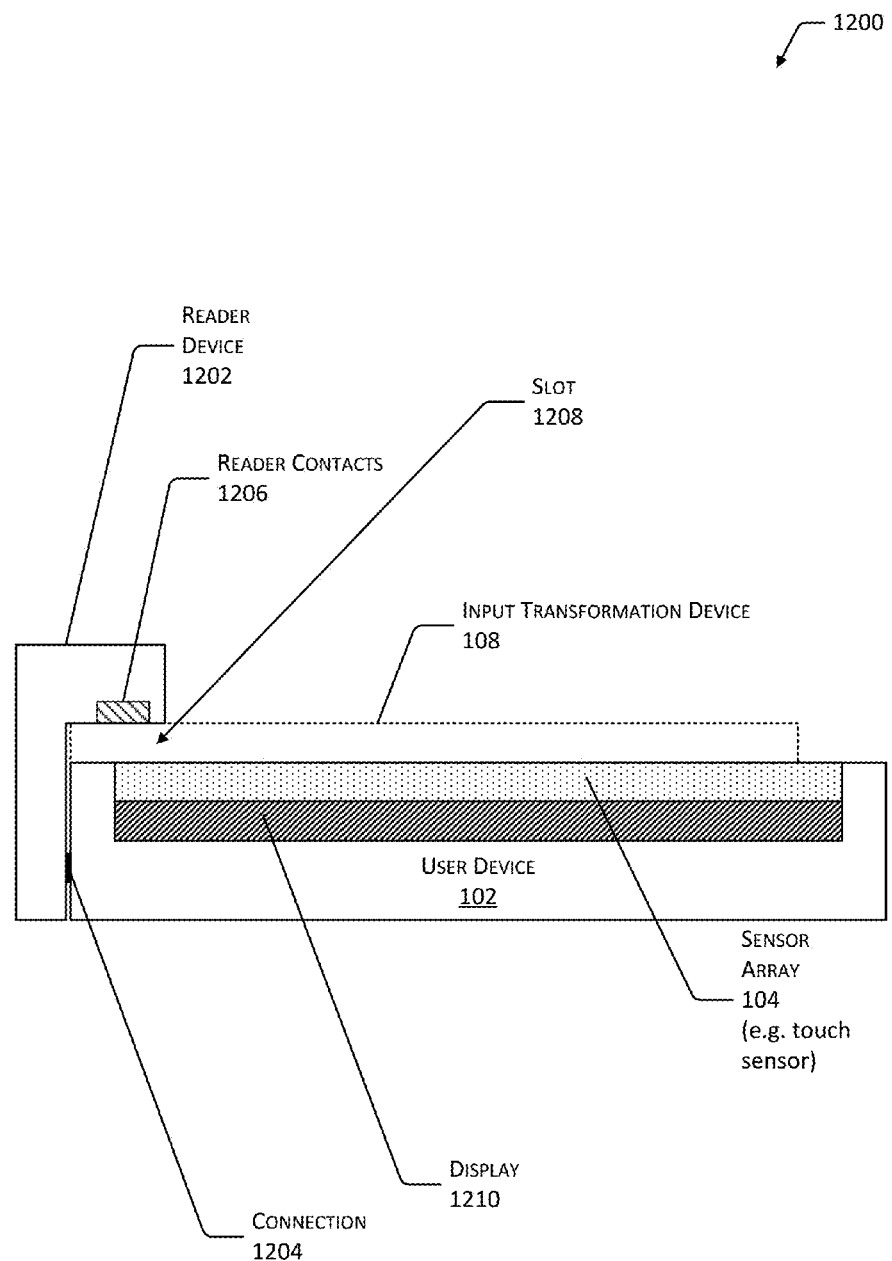
FIG. 12 illustrates a cross section of a reader device configured to couple to the user device and the input transformation device, according to one implementation.

FIG. 12 illustrates a cross section 1200 of a system including a reader device configured to couple to the user device and the input transformation device 108, according to one implementation.

The input transformation device 108 as described above, such as with regard to FIGS. 1-11 may include functionality associated with a smart card, such as an EMV card. For example, the input transformation device 108 may include input pads 110, an interconnect matrix 112, output pads 114, and so forth. The smart card, EMV card, chip card, integrated circuit card, and so forth may be a portable device, such as a pocket-sized or credit-card-sized card device, with circuitry embedded therein. The smart card may comprise microprocessor components and one or more of a volatile or non-volatile memory. The memory may store information, such as credit card information, card number, PIN number, personal details regarding the card holder, account number or numbers, payment server addresses, and so forth. The smart card may be programmed to perform certain specific operations, execute applications stored in its memory, and so forth. The smart card may also provide strong security authentication for single sign-on and may include specialized cryptographic hardware that uses algorithms such as triple data encryption standard (DES), Rivest Shamir Adleman (RSA) or digital signature algorithm (DSA). The smart card is generally capable of containing more information than a magnetic stripe card and may be prepared and programmed for different tasks. Some cards may contain programming and data to support multiple applications and some may be updated to add new applications after they are issued. The smart card may be designed to be inserted into a slot and read by a card reader device 1202 or to be read at a distance using near field communication (NFC) techniques. Additional information may be obtained from the smart card standard ISO 7816. The smart card may be regarded from a secure payment point of view as a highly secure device.

A reader device 1202 may be configured to couple to the user device 102 by way of a connection 1204. The connection 1204 may comprise a proprietary connector or a standardized connector. For example, the standardized connection 1204 may comprise an audio "headphone" connection of the user device 102, an I2C connection, a USB connection, and so forth. In another example, the proprietary connector may comprise the Lightning™ connector as promulgated by Apple Inc. of Cupertino, Calif. In other implementations, the reader device 1202 may be incorporated into the user device 102. The reader device 1202 may be connected to the user device 102 wired or wirelessly. In other implementations, an adapter may enable connection of the reader device 1202 to the user device 102. The reader device 1202 may comprise a smart card reader slot 1208 where a smart card may fully or partially be inserted into. The smart card reader slot 1208 may or may not be fitted with a protective cover.

In some implementations, the card reader device 1202 may also comprise a magnetic stripe reader with a reader slit, through which a card having a magnetic stripe may be slid for reading. The reader device 1202 may also comprise a near field communication (NFC) device capable of reading all type of equipment having NFC capabilities or fitted with a NFC tag. The reader device 1202 may comprise all or some of a card reader for reading and writing information on a microchip embedded on a smart card, special hardware units for decryption/encryption of the information read and written to and from the microchip and the magnetic stripe, hardware and software for communicating with external devices such as user device 102, one or more of hardware or software performing decryption and encryption of all incoming and outgoing communication with external units, and so forth. The encryption/decryption performed by the reader device 1202 is designed to fulfill all the requirements of world-wide standards of security of online transfer of credit card details. The reader device 1202 may also be made tamper proof so that the circuits and the software inside the reader device 1202 are destroyed beyond recovery if the card reader device 1202 is disassembled in any way with or without force.

The reader device 1202 includes one or more reader contacts 1206 configured to electrically couple with corresponding contacts on the input transformation device 108 upon engagement. In other implementations where the smart card implements a contactless solution, such as NFC, the reader device 1202 may incorporate an NFC or other contactless communication system. The portion of the reader device 1202 that overlaps with or overlies the top-side of the user device 102, such as the portion containing the reader contacts 1206, may be permanently connected to the portion that includes connection 1204. In other implementations a swivel connection or hinge-like connection may join portions of the reader device 1202. In other implementations, a snap fit or mechanical interface may couple the two portions.

The user may place the input transformation device 108 atop the sensor array 104 and insert it such that the reader contacts 1206 come into contact with corresponding contacts on the input transformation device 108, establishing an electrical connection.

When in the coupled configuration, the input transformation device 108 may participate in the authentication process. For example, the input transformation device 108 may exchange information with the user device 102 by way of the reader contacts 1206, with the information being used to configure the interconnect matrix 112. Continuing the example, to authenticate a transaction, the user may enter their previously determined PIN number using the input transformation device 108. The input transformation device 108 redirects the input values 116 to different output coordinates 122 using the configured interconnect matrix 122, and the user device 102 receives sensor array data 106. The sensory array data 106 may comprise data including, but not limited to encrypted information, encryption keys, digital signatures, and so forth.

The server 126 may then process the sensor array data 106 and determine if the correct input values 116 corresponding to the PIN were entered, without the user device 102 ever having knowledge of the input value 116. For example, the input transformation device 108 may act as a "one time pad", with the interconnect matrix 112 having a different configuration with each use. Continuing the example, while the user may remember a single input value 116 such as a PIN, the transformative input device 108 converts that single PIN into single use PINs.

In some implementations, other information may be exchanged between the user device 102, the input transformation device 108, the server 126, the reader device 1202, or other devices. For example, data received from an EMV chip by way of the reader device 1202, the sensor array data 106, transaction details generated by the user device 102, and so forth, may be provided to the server 126. The server 126 may provide information, such as a challenge to the user device 102, which provides the information via the connection 1204 to the reader device 1202. The information may be used to configure the interconnect matrix 112. In another implementation, the data may be transferred from the user device 102 to the input transformation device 108, such as via signaling using a display 1210 of the user device 102.

In some implementations, the sensor array data 106 or other information indicative of the input values 116 may be digitally signed. For example, data from the EMV chip may be used to digitally sign the sensor array data 106. The digitally signed data may be verified cryptographically by another device, such as the server 126.

In some implementations, the input transformation device 108 may be used in conjunction with a separate smart card. For example, an EMV card may be communicatively coupled to the reader device 1202 while the input transformation device 108 is coupled to the sensor array 104 of the user device 102.

In another implementation, the reader device 1202 may comprise a magnetic strip reader and omit the reader contacts 1206. In this implementation, the input transformation device 108 may include a magnetic strip configured to be read by the magnetic strip reader. The input transformation device 108 may be scanned by the magnetic strip reader, and may then be placed on the sensor array 104 to operate as described above. Subsequently, the user may use the input transformation device 108 to enter information, such as a PIN, password, and so forth. In this implementation, merchants may enjoy the benefits of increased security using existing hardware.

In some implementations, the input transformative device 108 may be at least partially optically transparent or translucent. For example, an image presented by a display 1210 of the user device 102 may be visible to the user through the input transformation device 108, or a portion thereof. In this implementation, one or more of the visual indicia 120 may be provided by the display 1210 of the user device 102, instead of, or in addition to, the visual indicia 120 provided by the input transformation device 108.

The reader device 1202 may be incorporated into, or act at least in part as, an accessory case for the user device 102. For example, the reader device 1202 may include sides and a back designed to cradle the user device 102.

As should be apparent from the preceding discussion of FIGS. 1-12, the input transformation device 108 can be used in various multifactor authentication schemes. These factors may include a knowledge factor (something only the user is presumed to know such as a PIN or passcode the user enters by touching in sequence the touch pads on the top of the card), a possession factor (something only the user is presumed to have, such as the input transformation device 108 having an interconnect matrix 112), or an inherent factor (something only the user is or has, such as a fingerprint).

In some implementations, the input transformation device 108 may be operated in conjunction with other sensors, such as a fingerprint reader. The input transformation device 108 may include these other sensors, or they may be incorporated into the user device 102. For example, the input transformation device 108 may include an integrated fingerprint reader. The user may input information such as a PIN using the input transformation device 108 and may then provide a fingerprint using the fingerprint reader of the input transformation device 108.

In another implementation, the input pads 110 may be configured at a very high resolution or density, allowing the input transformation device 108 to "read" a fingerprint. The output from these input pads 110 may either be read by the processor 304 of the input transformation device 304 or may be connected using the interconnect matrix 112 to output pads 114. For example, the input transformation device 108 may be configured to "enlarge" the user's fingerprint such that features of the fingerprint are distributed across a larger area of output pads 114, thus allowing the sensor array 104 to accept fingerprint input that would otherwise be too fine in detail to be detected.

The systems discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments of this invention may include those described in the following clauses.

1. A portable device comprising:
an input pad comprising an electrically conductive material, wherein the input pad is configured to accept a touch;
one or more output pads comprising an electrically conductive material, wherein the one or more output pads are configured to electrically interact with one or more capacitive sensor elements of a touch sensor external to the device;
an insulator configured to separate the input pad from the one or more output pads, wherein the input pad is disposed on an input side and the one or more output pads are disposed on an output side opposite the input side; and
one or more electrically conductive elements coupling the input pad and the one or more output pads.

2. The device of clause 1, further comprising:
a communication interface configurable to communicate with an external device;
one or more transistors configurable to selectively connect the one or more electrically conductive elements from the input pad to particular ones of the one or more output pads; and
a processor configured to execute one or more instructions to:
receive, using the communication interface, interconnect data indicative of one or more particular connections between the input pad and the particular ones of the one or more output pads; and
configure, using the one or more transistors, the one or more particular connections.

3. The device of clause 1 or 2, further comprising:
one or more transistors configurable to connect or disconnect the one or more electrically conductive elements from the input pad to particular ones of the one or more output pads; and
a processor configured to activate or deactivate the one or more transistors.

4. The device of any of clauses 1-3, further comprising:
one or more capacitive elements coupled to one or more output pads disposed on the output side in a predetermined arrangement, wherein the one or more capacitive elements are configured to electrically interact with at least a subset of the one or more capacitive sensor elements of the touch sensor external to the device.

5. A device comprising:
an input structure comprising a plurality of input pads configured to accept input;
an output structure comprising a plurality of output pads configured to couple to one or more sensor elements of a sensor array external to the device, wherein the plurality output pads are configured for placement proximate to the one or more sensor elements of the sensor array; and
an interconnect matrix configured to transfer at least a portion of the input accepted at the input structure to the output structure.

6. The device of clause 5, wherein the input comprises one or more of:
an applied mechanical force,
electrical capacitance,
electrical resistance,
electrical inductance, or
an optical signal.

7. The device of clause 5 or 6, wherein the interconnect matrix couples a single input pad to the plurality of output pads, and further wherein at least a portion of the plurality of output pads are non-adjacent to one another.

8. The device of any of clauses 5-7, further comprising:
one or more capacitive elements; and
wherein the interconnect matrix is configured to provide an electrical connection between the one or more capacitive elements and one or more of the plurality of output pads.

9. The device of any of clauses 5-8, the output structure further comprising:
a component configured to generate a signal in the one or more sensor elements of the sensor array external to the device.

10. The device of any of clauses 5-9, wherein the interconnect matrix comprises a plurality of electrically conductive elements configured to establish a predetermined relationship between at least one input pad and at least one output pad.

11. The device of any of clauses 5-10, further comprising:
a receptacle coupled to at least a portion of the plurality of input pads and to at least a portion of the plurality of output pads, the receptacle configured to accept the interconnect matrix; and
wherein the interconnect matrix, upon engagement with the receptacle, connects at least one input pad and at least one output pad.

12. The device of any of clauses 5-11, wherein the interconnect matrix comprises one or more semiconductor devices configured to selectively establish an electrical connection between one or more of the plurality of input pads and one or more of the plurality of output pads; and
further comprising:
a processor configured to control operation of the one or more semiconductor devices.

13. The device of clause 12, further comprising:
a communication interface coupled to the processor; and
wherein the processor is further configured to:
receive, using the communication interface, interconnect data indicative of interconnections between the one or more of the plurality of input pads and the one or more of the plurality of output pads; and
configure the one or more semiconductor devices of the interconnect matrix using the interconnect data.

14. The device of any of clauses 5-13, wherein the sensor array comprises a capacitive touch sensor and the coupling between the one or more sensor elements of the sensor array and the plurality of output pads is capacitive.

15. A method comprising:
coupling, using an interconnect matrix, an input pad to a first subset of one or more output pads;
placing, proximate to a sensor array, the one or more output pads;
accepting an input at an input pad; and
directing, using the interconnect matrix, at least a portion of the input from the input pad to the first subset of the one or more output pads.

16. The method of clause 15, further comprising:
coupling one or more components configured to generate a signal in the sensor array to a second subset of the one or more output pads, wherein the coupling presents, to the sensor array, a predetermined pattern of signals configured to encode data.

17. The method of clauses 15 or 16, further comprising:
reconfiguring the interconnect matrix to couple the input pad to a second subset of the one or more output pads, wherein the second subset is different from the first subset;
accepting a second input at the input pad; and
directing, using the reconfigured interconnect matrix, at least a portion of the input from the input pad to the second subset of the one or more output pads.

18. The method of any of clauses 15-17, further comprising:
accessing map data indicative of the coupling of the interconnect matrix;
detecting, using the sensor array, a first set of signals generated at least in part by the input as directed to the one or more output pads by the coupling; and
transforming, using the map data, a first value based at least in part on the first set of signals to a second value.

19. The method of any of clauses 15-18, further comprising:
detecting, using the sensor array, a second set of signals generated at least in part by a signal producing component coupled to a second subset of the one or more output pads; and
wherein the second set of signals are indicative of authentication credentials associated with a user.

20. The method of any of clauses 15-19, further comprising:
detecting, using the sensor array, a second set of signals generated at least in part by a signal producing component coupled to a second subset of the one or more output pads; and
wherein the second set of signals are indicative of encoded data, the encoded data comprising:
an indicia of orientation of one or more of:
the input pad or the one or more output pads relative to the sensor array, or
information indicative of a configuration of the interconnect matrix; and
wherein the transforming further uses the encoded data.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the devices and techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A portable device comprising:
a housing comprising opposing first and second sides separated by an interior portion;
an input pad disposed on the first side of the housing, wherein the input pad comprises an electrically conductive material and wherein the input pad is configured to accept a touch input;
a plurality of output pads disposed on the second side of the housing, wherein the plurality of output pads comprise an electrically conductive material and wherein the plurality of output pads are configured to electrically interact with one or more capacitive sensor elements of a touch sensor associated with a different device external to the housing;
an insulator disposed within the interior portion, wherein the insulator is configured to separate the input pad from the plurality of output pads; and
an interconnect matrix having one or more electrically conductive elements disposed within the interior portion, wherein the one or more electrically conductive elements couple the input pad and a subset of the plurality of output pads such that only the subset of the plurality of output pads are detected by the one or more capacitive sensor elements of the touch sensor associated with the different device when the second side of the housing is proximate to the one or more capacitive sensor elements with the plurality of output pads facing the one or more capacitive sensor elements, the interconnect matrix transforming a coordinate associated with an effect at the input pad to coordinates of the subset of the plurality of output pads, the coordinate associated with the effect at the input pad being different than the coordinates of the subset of the plurality of output pads.

2. The device of claim 1, further comprising:
a communication interface configurable to communicate with an external device;
one or more transistors configurable to selectively connect the one or more electrically conductive elements from the input pad to the subset of the plurality of output pads; and
a processor configured to execute one or more instructions to:
receive, using the communication interface, interconnect data indicative of one or more particular connections between the input pad and the subset of the plurality of output pads; and
configure, using the one or more transistors, the one or more particular connections.

3. The device of claim 1, further comprising:
one or more transistors configurable to connect or disconnect the one or more electrically conductive elements from the input pad to the subset of the plurality of output pads; and
a processor configured to activate or deactivate the one or more transistors.

4. The device of claim 1, further comprising:
one or more capacitive elements coupled to the plurality of output pads disposed on the second side in a predetermined arrangement, wherein the one or more capacitive elements are configured to electrically interact with at least a subset of the one or more capacitive sensor elements of the touch sensor associated with the different device.

5. A device comprising:
a housing comprising first and second surfaces separated by an interior portion;
an input structure disposed on the first surface, wherein the input structure comprises a plurality of input pads configured to accept input;
an output structure disposed on the second surface, wherein the output structure comprises a plurality of output pads configured to couple to one or more sensor elements of a sensor array external to the housing, wherein the plurality output pads are configured for placement proximate to the one or more sensor elements of the sensor array; and
an interconnect matrix at least partially disposed within the interior portion, wherein the interconnect matrix is configured to transfer at least a portion of the input accepted at the input structure to the plurality of output pads of the output structure when the second surface of the housing is proximate to the external sensor array.

6. The device of claim 5, wherein the input comprises an effect from a touch, the effect comprising one or more of:
an applied mechanical force,
electrical capacitance,
electrical resistance,
electrical inductance, or
an optical signal.

7. The device of claim 5, wherein the interconnect matrix couples a single input pad to at least a portion of the plurality of output pads, and further wherein at least a portion of the plurality of output pads are non-adjacent to one another.

8. The device of claim 5, further comprising:
one or more capacitive elements; and
wherein the interconnect matrix is configured to provide an electrical connection between the one or more capacitive elements and one or more of the plurality of output pads.

9. The device of claim 5, the output structure further comprising:
a component configured to generate a signal in the one or more sensor elements of the sensor array external to the device.

10. The device of claim 5, wherein the interconnect matrix comprises a plurality of electrically conductive elements configured to establish a predetermined relationship between at least one input pad and at least one output pad.

11. The device of claim 5, further comprising:
a receptacle coupled to at least a portion of the plurality of input pads and to at least a portion of the plurality of output pads, the receptacle configured to accept the interconnect matrix; and
wherein the interconnect matrix, upon engagement with the receptacle, connects at least one input pad and at least one output pad.

12. The device of claim 5, wherein the interconnect matrix comprises one or more semiconductor devices configured to selectively establish an electrical connection between one or more of the plurality of input pads and one or more of the plurality of output pads; and further comprising:
a processor configured to control operation of the one or more semiconductor devices.

13. The device of claim 12, further comprising:
a communication interface coupled to the processor; and
wherein the processor is further configured to:
receive, using the communication interface, interconnect data indicative of interconnections between the one or more of the plurality of input pads and the one or more of the plurality of output pads; and
configure the one or more semiconductor devices of the interconnect matrix using the interconnect data.

14. The device of claim 5, wherein the sensor array comprises a capacitive touch sensor and the coupling between the one or more sensor elements of the sensor array and the plurality of output pads is capacitive.

15. A method comprising:
coupling, using an interconnect matrix, an input pad on a first surface of a housing to a first subset of one or more output pads on a second surface of a device;
accepting an effect as an input at an input pad at a first coordinate relative to a fixed reference point; and
directing, using the interconnect matrix, at least a portion of the input at the input pad at the first coordinate to the first subset of the one or more output pads at one or more different locations on the second surface, each of the one or more different locations having a coordinate relative to the fixed reference point, the first coordinate being different than the coordinate of the one or more locations, wherein the sensor array is configured to accept touch input provided by the first subset of the one or more output pads.

16. The method of claim 15, further comprising:
coupling one or more components configured to generate a signal in the sensor array to a second subset of the one or more output pads, wherein the coupling presents, to the sensor array, a predetermined pattern of signals configured to encode data.

17. The method of claim 15, further comprising:
reconfiguring the interconnect matrix to couple the input pad to a second subset of the one or more output pads, wherein the second subset is different from the first subset;
accepting a second input at the input pad; and
directing, using the reconfigured interconnect matrix, at least a portion of the input from the input pad to the second subset of the one or more output pads.

18. The method of claim 15, further comprising:
accessing map data indicative of the coupling of the interconnect matrix;
detecting, using the sensor array, a first set of signals generated at least in part by the input as directed to the one or more output pads by the coupling; and
transforming, using the map data, a first value based at least in part on the first set of signals to a second value.

19. The method of claim 18, further comprising:
detecting, using the sensor array, a second set of signals generated at least in part by a signal producing component coupled to a second subset of the one or more output pads; and
wherein the second set of signals are indicative of authentication credentials associated with a user.

20. The method of claim 18, further comprising:
detecting, using the sensor array, a second set of signals generated at least in part by a signal producing component coupled to a second subset of the one or more output pads; and wherein the second set of signals are indicative of encoded data, the encoded data comprising:
an indicia of orientation of one or more of:
the input pad or the one or more output pads relative to the sensor array, or
information indicative of a configuration of the interconnect matrix; and
wherein the transforming further uses the encoded data.

\* \* \* \* \*